United States Patent
Nimura et al.

[11] Patent Number: 5,842,147
[45] Date of Patent: Nov. 24, 1998

[54] NAVIGATION DISPLAY DEVICE WHICH INDICATES GOAL AND ROUTE DIRECTION INFORMATION

[75] Inventors: Mitsuhiro Nimura, Okazaki; Kunihiro Yamada, Anjo; Kazuteru Maekawa, Aichi-ken, all of Japan

[73] Assignee: Aisin AW Co., Ltd., Aichi-ken, Japan

[21] Appl. No.: 611,884

[22] Filed: Mar. 6, 1996

[30] Foreign Application Priority Data

| Mar. 6, 1995 | [JP] | Japan | 7-045323 |
| Mar. 7, 1995 | [JP] | Japan | 7-047364 |
| Jun. 30, 1995 | [JP] | Japan | 7-188015 |

[51] Int. Cl.$^6$ .................................................. G01C 21/00
[52] U.S. Cl. ........................ 701/211; 340/995; 701/201; 701/300
[58] Field of Search .................................. 701/201, 207, 701/209, 211, 210, 205, 300; 340/995

[56] References Cited

U.S. PATENT DOCUMENTS

| 5,444,629 | 8/1995 | Kishi et al. | 364/449 |
| 5,450,343 | 9/1995 | Yurimoto et al. | 364/449 |
| 5,508,917 | 4/1996 | Siegle et al. | 364/424.02 |
| 5,559,511 | 9/1996 | Ito et al. | 340/995 |
| 5,587,911 | 12/1996 | Asano et al. | 364/444.2 |
| 5,627,547 | 5/1997 | Ramaswamy et al. | 342/357 |

*Primary Examiner*—Michael Zanelli

[57] ABSTRACT

A goal direction mark and a distance to a goal are indicated when the car has approached the end point of route. When the car has deviated from the guide route to the goal or is running backwards on the guide route in a direction that is opposite to the direction of the goal, there is indicated a mark to inform the direction of progress to the goal on the guide route. When the car has deviated from the guide route and the guide route is not indicated on the map picture, there is indicated the direction to the goal or the direction to the guide route itself. When the start point of route is remote from the present position at the start of the guidance, a mark is indicated to inform the direction to the start point of route. The driver is enabled to easily determine relying upon the indicated mark in which direction he should proceed. When the map picture is scrolled, there is informed the goal direction, route direction or the direction of progress to the goal on the route. The user therefore is enabled to easily know the direction to the goal.

40 Claims, 24 Drawing Sheets

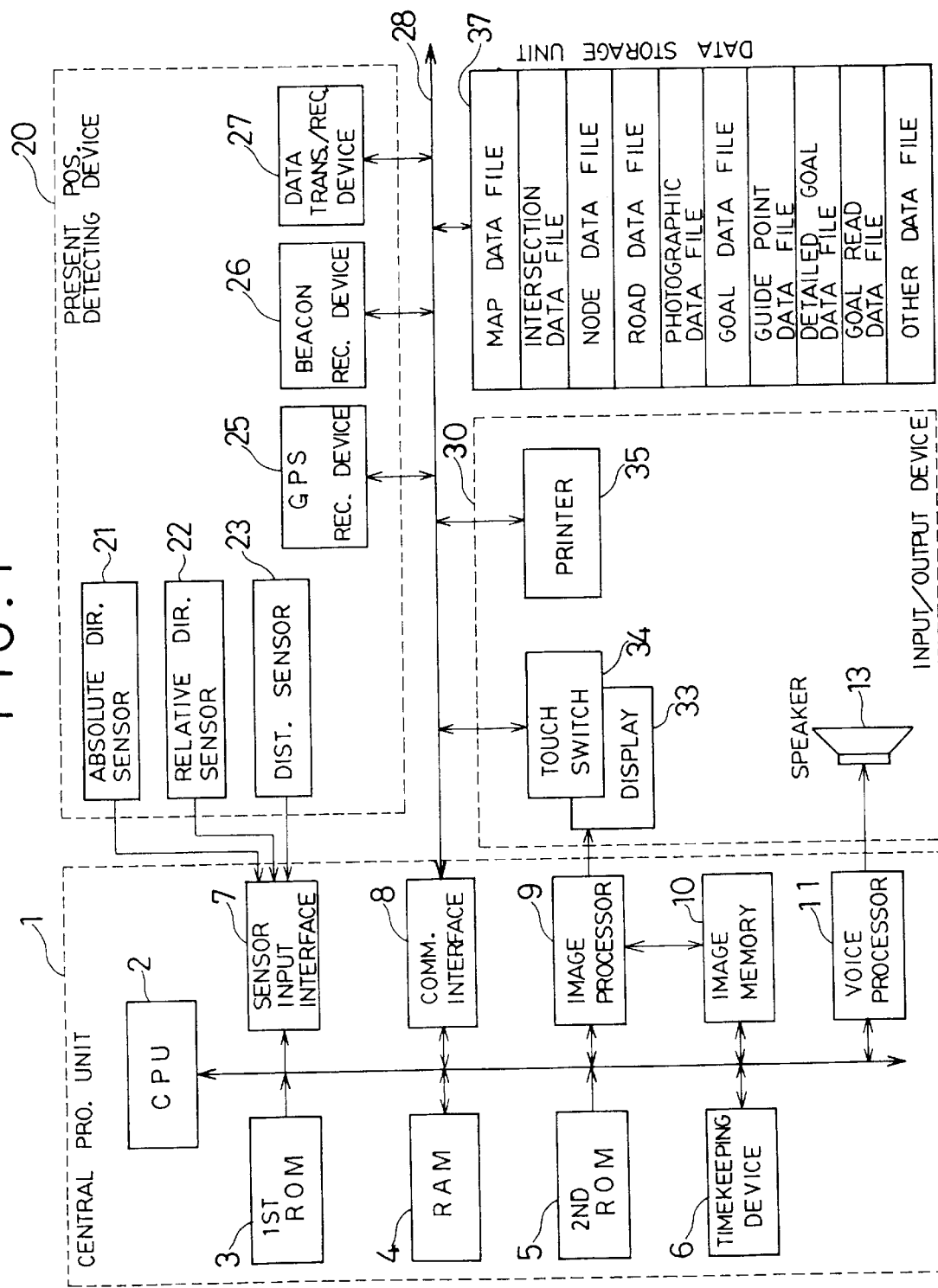

FIG. 2

RAM4

| | | | |
|---|---|---|---|
| EXTERNAL DATA | GD | PRESENT POS. | MP |
| ABSOLUTE DIR. | ZD | ANGLE OF RELATIVE DIR. | θ |
| DIST. TRAVELED | ML | INFORMATION OF PRESENT POS. | P1 |
| VICS DATA | VD | ATIS DATA | AD |
| GOAL | TP | GUIDE ROUTE | MW |
| DIR. OF PROGRESS | SH | INTERSECTING POINT | CP |
| DIR. OF ROUTE | KH | DIST. TO THE ROUTE | KK |
| START POINT OF ROUTE | SP | END POINT OF ROUTE | EP |

| | | | |
|---|---|---|---|
| DIR. OF GOAL | MH | DIST. TO THE GOAL | MK |

| | | | |
|---|---|---|---|
| GUIDE START FLAG | SF | DIR. OF START POINT OF ROUTE | AH |
| DIST. TO THE START POINT OF ROUTE | SK | | |

F I G. 4
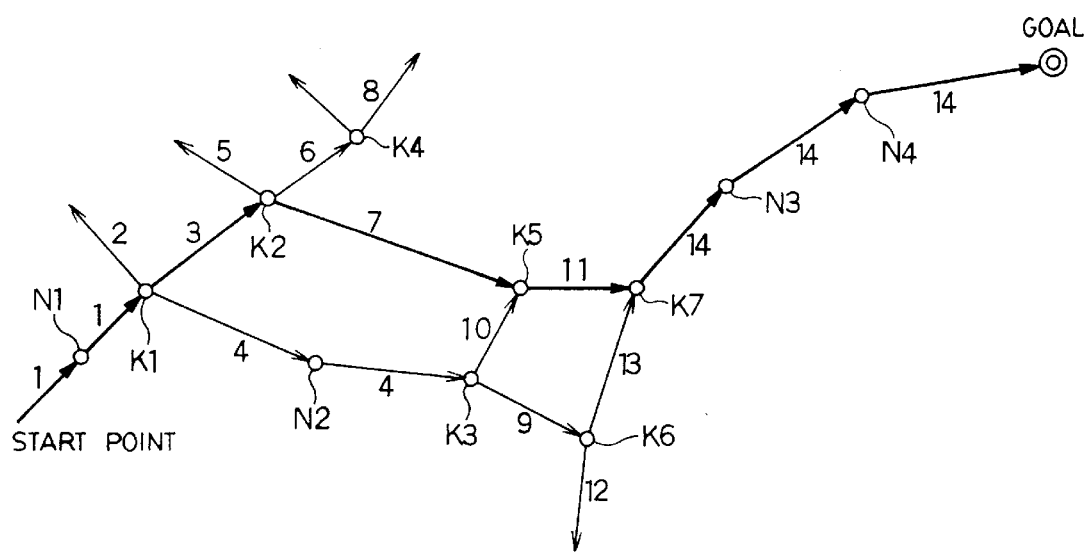

NAVIGATION DISPLAY DEVICE WHICH INDICATES GOAL AND ROUTE DIRECTION INFORMATION

FIELD OF THE INVENTION

The present invention relates to a navigation device for letting the user know (informing) the direction of a goal, the direction of route or the direction of progress, so that the route to the goal can be easily recognized.

DESCRIPTION OF THE BACKGROUND ART

In conventional navigation devices, after the goals are input by a user, an operator inputs the routes to the goals, or the guide routes to the goals are automatically found. The routes to the goals are indicated as attractive lines such as thick lines on the map picture. The routes to the goals are the best, shortest or recommended routes to the goals. Hereinafter, the routes to the goals are referred to as guide routes.

In the conventional navigation device, however, roads narrower than a predetermined width such as lanes have not in many cases been stored. Taking an example, furthermore, a club house in a golf course exists on a vast land. A public road up to the entrance of the golf course may be stored as road data, but a private road in the golf course has not, in many cases, been stored as road data.

A place that has not been stored as the road data may often be selected as a goal. In the conventional navigation device in such a case, a point closest to the goal among the map data that are stored, such as an intersection closest to the goal, an entrance to the goal or an end of the road headed to the goal, is determined to be a final point of guide. Then, a route to the final point of guide is searched and is guided. Hereinafter, the final point of guide is referred to as an end point of route.

In the conventional navigation device, the map of a large scale has been shown and if the end point of route is remote from the goal, the goal is not indicated on the map picture even when the car has arrived at the end point of route. Therefore, the driver has no idea in which direction he should move to arrive at the goal from the end point of route.

Similarly, the present position may not often be stored as the road data. In the conventional navigation device in such a case, a point closest to the present position in the stored map data is determined to be a start point of guide. Then, the guide route starts from the start point of guide to guide the route. Hereinafter, the start point of guide is referred to as a start point of route.

In this way, when the start point of route is remote from the present position, no guide is effected from the present position up to the start point of route. Therefore, the driver may find it difficult to arrive at the start point of route or at the guide route.

According to another conventional navigation device, the direction of goal is indicated when the car has arrived at the end point of route or the direction of goal is indicated when the car has entered into a range within a predetermined distance from the goal. When the end point of route happens to be an intersection, however, it may not be allowed to suddenly change the direction of the car in the intersection. Moreover, even when there is a road leading to the goal just before the end point of route, the driver may not be able to judge whether he should proceed along this road or not. Furthermore, the car may enter into a range within a predetermined distance from the goal and the direction of goal may be indicated. Even in this case, however, the direction of the goal is not indicated when the distance from the end point of route to the goal is larger than the predetermined distance. Therefore, the driver is unable to determine in which direction he should proceed from the end point of route.

When the car is running deviated from the guide route as shown in FIG. 28, furthermore, the present position mark H3 is on a road H4 on which the car is now running. The guide route H2, however, is remote from the present position mark H3. In this case, when the goal is not indicated on the map picture H1, what are indicated on the map picture H1 are simply the direction H5 and the reduced scale H6. The driver is unable to learn the direction of the goal. The driver is unable to know in which direction he should be headed after he has returned to the guide route H2.

When the car is running on the guide route, furthermore, the present position H3 is indicated on the guide route H2 on the map picture H1 as shown in FIG. 29. Though the car may be running along the guide route, however, it may happen that the driver is headed in a direction opposite to the direction to the goal. In such a case, the present position H3 is indicated on the guide route H2 but the driver is unaware of the fact that he is running in the opposite direction.

Neither the goal nor the guide route H2 are indicated on the map picture H1 while the car is running deviated from the guide route, the driver is therefore quite at a loss as to which direction he should go.

In order to make sure the direction of the goal, furthermore, the driver may scroll the map picture H1. In this case, when the direction in which the picture is scrolled is not in agreement with the direction of the goal, the driver is not able to search (find) the goal.

SUMMARY OF THE INVENTION

The present invention was accomplished in order to solve the above-mentioned problems, and its first object is to enable the car to easily arrive at the goal from the end point of route when the end point of route is not in agreement with the goal but is remote from the goal. A second object is to enable the car to easily return to the guide route in case the car has deviated out of the guide route. A third object is to let the user know (inform) a correct direction of progress when the car is running on the guide route in a direction opposite to the direction of the goal. A fourth object is to enable the car to easily arrive at a start point of route in case the start point of route is remote from the present position. A fifth object is to enable the user to easily know the direction of the goal when the map picture is scrolled.

In order to accomplish the above-mentioned objects, the present invention lets the user know the direction of the goal when the end point of route has entered into the map picture. Therefore, the driver is enabled to easily arrive at the goal even when the goal is remote from the end point of route and is not indicated on the map picture. The driver is further enabled to change his direction at the end point of route without hurry. The driver is enabled to easily take the road that leads to the goal just before the end point of route.

When the car has deviated out of the route to the goal, the device lets the driver know the direction of the goal, the direction of progress on the route or the direction of the route itself. Therefore, the driver is enabled to easily determine the correct direction for arriving at the goal and can easily bring the car back to the route that leads to the goal. When the car is running on the route in a direction opposite to the direction of the goal, the device lets the driver know the direction of progress toward the goal. The driver then realizes that he is running in the opposite direction and then proceeds in the correct direction. When the start point of route is remote from the present position, the device lets the driver know the direction of the start point of route. Thus, the driver is enabled to easily arrive at the start point of route.

When the map picture is scrolled, furthermore, there is indicated the direction of the goal, the direction of progress on the route or the direction in which the route exists. Accordingly, the user is enabled to easily make sure the direction of the goal without losing the direction of the goal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein:

FIG. 1 is a diagram illustrating the whole circuit of a navigation device;

FIG. 2 is a diagram illustrating part of the data stored in a RAM 4;

FIG. 4 is a diagram illustrating an example of guide route data MW;

PRO: PROCESSING, COMM: COMMUNICATION, POS: POSITION,

TRANS: TRANSMISSION, DIR: DIRECTION, REC: RECEPTION,

DIST: DISTANCE, No: NUMBER, DES: DESTINATION, PRED: PREDETERMINED.

DESCRIPTION OF THE PREFERRED EMBODIMENTS

Summary of the Embodiments

Figure 8:
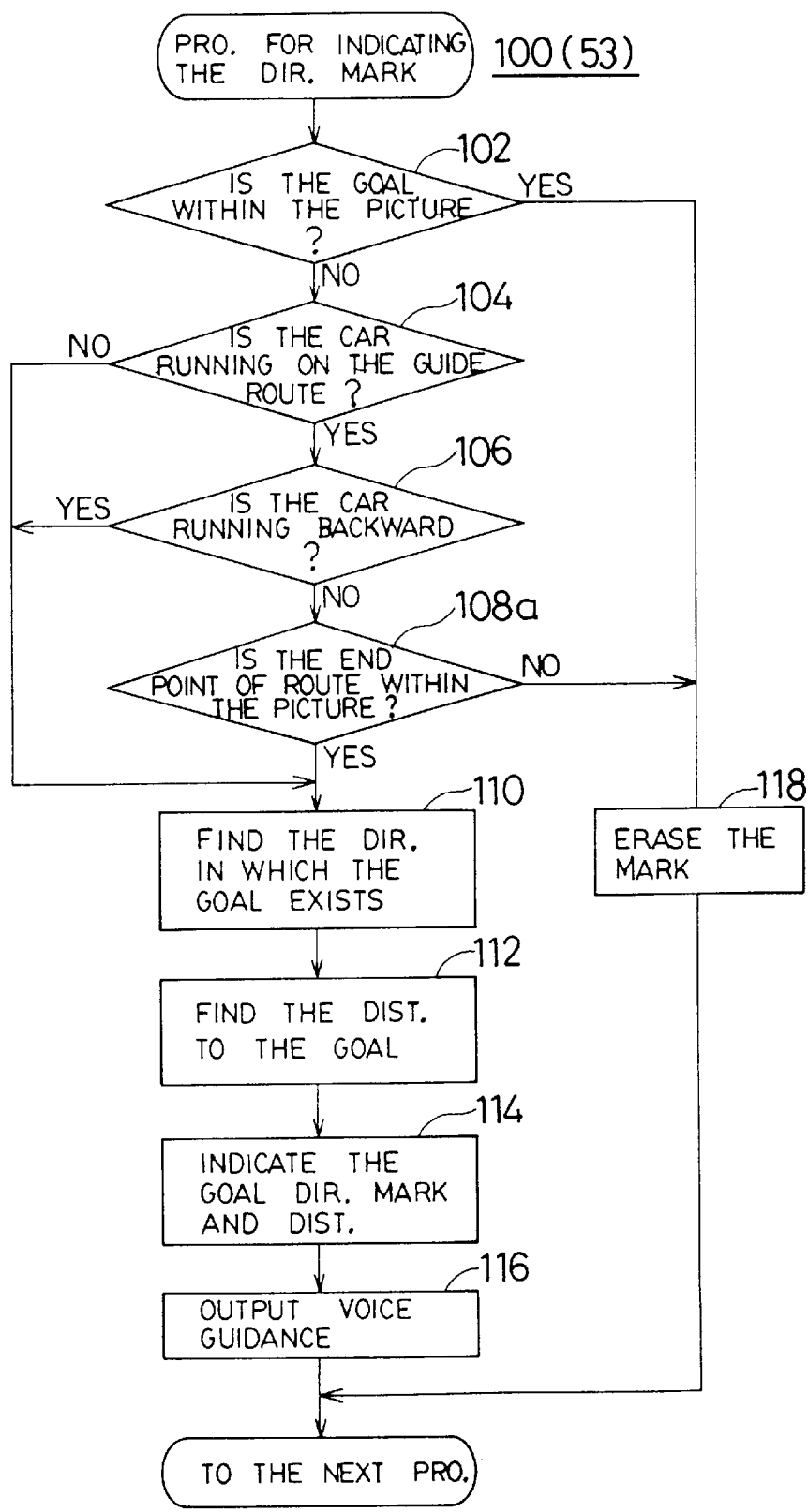
FIG. 8 is a flow chart of a processing for indicating the direction mark executed according to the first embodiment.

When no goal is indicated on the picture (step 102 in FIG. 8) but an end point of route is indicated on the map picture (step 108 in FIG. 8), the direction of the goal and the distance to the goal are calculated (steps 110 and 112 in FIG. 8). Then, there are indicated a mark MC representing the direction of the goal and the distance to the goal (step 114 in FIG. 8). Indication of this mark and distance enables the driver to easily determine in which direction he should proceed.

Figure 12:
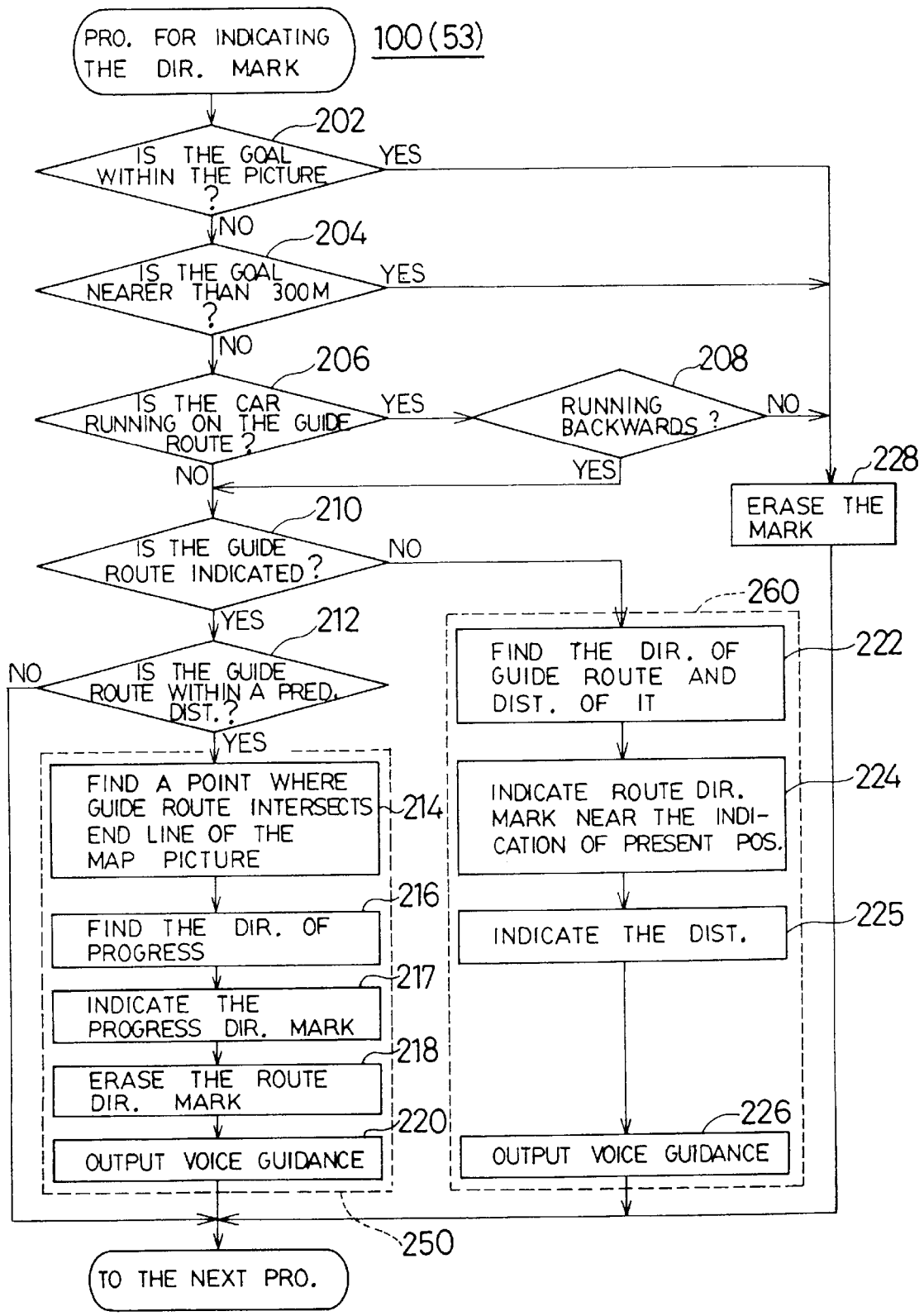
FIG. 12 is a flow chart of a processing for indicating the direction mark executed according to a third embodiment.

When the car is deviated out of the guide route to the goal and the guide route is indicated on the map picture, the direction of progress to the goal along the guide route is found (step 216 in FIG. 12). A mark representing the direction of progress to the goal is indicated at a point where the guide route intersects an end line of the map picture (step 217 in FIG. 12). A mark representing the direction of progress to the goal is indicated even when the car is running in a direction opposite to the direction of the goal on the guide route (steps 208, 210 to 217 in FIG. 12). When the guide route is not indicated on the map picture, the direction of the guide route itself is indicated (steps 222, 224 in FIG. 12) or the direction of the goal is indicated (steps 230, 232 in FIG. 17). Indication of the mark enables the driver to easily determine a correct direction of progress. When the start point of route is remote from the present position at a moment of starting the guidance, the direction of the start point of route is indicated (step 290 in FIG. 18).

Figure 26:
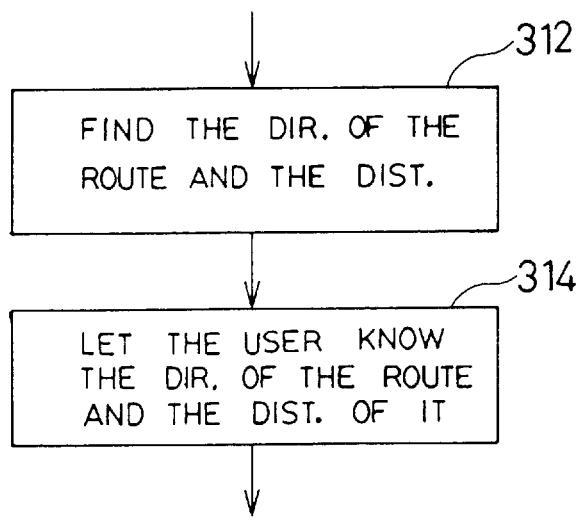
FIG. 26 is a flow chart of part of a processing for letting the user know the direction of route executed according to a tenth embodiment.
Figure 27:
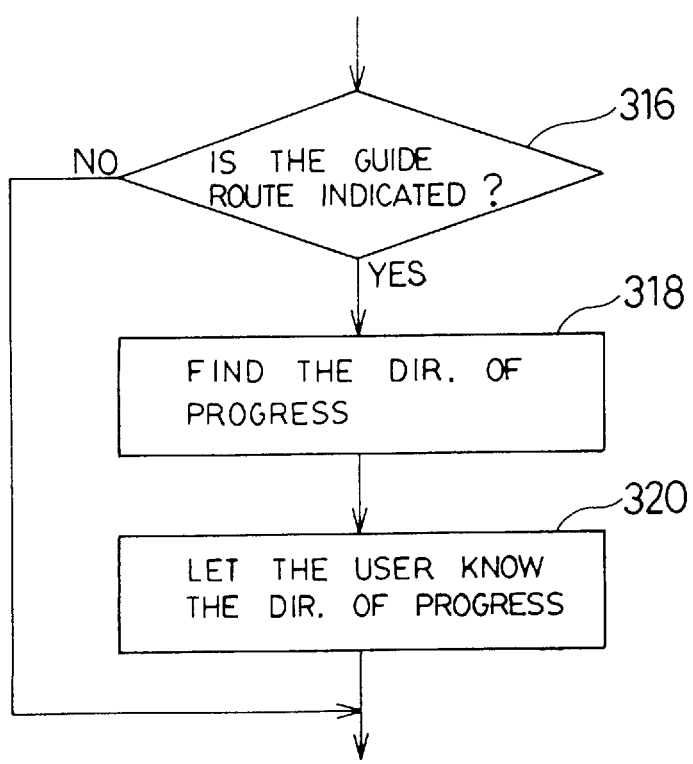
FIG. 27 is a flow chart of a processing for letting the user know the direction of progress of route executed according to an eleventh embodiment.

When the map picture is scrolled by the user (step 302 in FIG. 24), the device lets the user know the direction of the goal (step 306 in FIG. 24), lets the user know the direction of the guide route itself (step 314 in FIG. 26) or lets the user know the direction of progress to the goal along the route (step 320 in FIG. 27). When the picture is scrolled, therefore, the user is enabled to easily know the direction of the goal.

1. Whole Circuit.

FIG. 1 is a diagram illustrating the whole circuit of the navigation device. A central processing unit 1 includes a CPU 2 which controls the operation of the navigation device and executes the arithmetic operation. A first ROM 3 stores system programs executed by the CPU 2, programs and a variety of parameters (data) for indication control and voice guidance control. A RAM 4 stores the data input from external units, a variety of parameters (data) used for arithmetic operation and the results of operation. A second ROM 5 stores the indication data for guiding the route and for controlling the indication of map.

A timekeeping device 6 generates data related to the time. A sensor input interface 7 receives the detection data from an absolute direction sensor 21, a relative direction sensor 22 and a distance sensor 23 in a present position detecting device 20, and sends the data to the CPU 2. A communication interface 8 transmits and receives various data to and from the units connected thereto via a data bus 28.

An image processor 9 reads the image data stored in an image memory 10 and sends them to a display 33. The display 33 is a device capable of displaying an image such as a CRT, a liquid crystal display or a plasma display, etc. The image memory 10 stores image data displayed on the display 33, and transmits and receives image data to and from the image processor 9. In response to an instruction from the CPU 2, the image processor 9 converts the data related to goals and data related to roads into data for display, and forms image data to be displayed on the display 33.

At this moment, surrounding images of the picture on the display 33 are also formed and are stored in the image memory 10. When an instruction for scrolling the picture is issued, the image data surrounding the picture that is displayed are quickly read out from the image memory 10. Therefore, it is enabled to scroll the picture.

A voice processor 11 receives data related to waveforms of synthesized voice read out by the CPU 2 from the ROM 3 or 5, forms analog voice waveforms, and sends them to a speaker 13.

A present position detecting device 20 detects the present position of the car, and obtains the data related to longitude and latitude. An absolute direction sensor 21 is, for example, a terrestrial magnetism sensor. And the sensor 21 detects, for example, terrestrial magnetism and outputs data that represents south-north direction which serves as an absolute direction. A relative direction sensor 22 is, for example, an angle-of-steering sensor which detects the angle of steering or a gyroscopic device such as a optical fiber gyroscope or a piezo-electric oscillation gyroscope. And the sensor 22 outputs data representing a difference in the direction of progress of the car from the absolute direction detected by the absolute direction sensor 21. A distance sensor 23 is, for example, a digital counter which is interlocked to a speedometer or an odometer, and outputs data related to a distance traveled by the car.

A GPS reception device 25 receives signals from the GPS (global positioning system) and outputs data related to the position. A beacon reception device 26 receives correction data from the GPS and beacon waves from an information offering system such as VICS (vehicle information and communication system), and outputs the received data. A data transmission/reception device 27 transmits and receives the present position data to and from a two-way (bidirectional) system that offers the data related to the present position utilizing FM multiple signals or a telephone circuit or to and from the ATIS (advanced traffic information system).

An input/output device 30 inputs the data for setting goals such as the starting point, the goals or the passing points, and outputs guide data while the route guidance is being executed. A transparent touch panel 34 is provided on the display 33. The touch panel has transparent touch switches that are arranged on a plane in the form of a matrix. A printer 35 prints various data such as map and guide to facilities that are received through the communication interface 8. A data storage unit 37 stores map data, intersection data, node data, road data, photographic data, goal data, guide point data, detailed goal data, goal read data and other data (indication guide data, voice guidance data, etc.) for guiding the route. The data storage unit is constituted by, a storage medium such as IC memory, CD-ROM, IC memory card, optical disk memory or magnetic disk memory and a write/read unit therefor.

2. Data Groups.

FIG. 2 illustrates part of groups of data stored in the RAM 4. Onto the external data GD are copied whole or part of the data stored in the data storage unit 37. The present position data MP are the ones representing the present position of the car and are detected by the present position detecting device 20. The absolute direction data ZD are those indicating the south-and-north direction, and are calculated based upon the data from the absolute direction sensor 21. The data θ related to the angle of relative direction represent the angle of direction of progress of the car relative to the absolute direction, and are calculated based upon the data from the relative direction sensor 22.

The data ML related to the distance traveled represent the distance traveled by the car and are calculated based upon the data from the distance sensor 23. The information of present position data PI are input from the beacon reception device 26 or the data transmission/reception device 27. The VICS data VD and the ATIS data AD are those of VICS or ATIS input from the beacon reception device 26 or the data transmission/reception unit 27. The goal data TP are those related to the goals such as positions and names of the goals, and are input by the user.

The guide route data MW are those data of a route which is most desirable, shortest or is recommended to arrive at the goal. The data SH related to the direction of progress represent the direction of progress on the guide route. The intersecting point data CP are coordinate data of a point where the guide route intersects an end line of the map picture. The data KH related to the direction of route represent (indicate) the direction of guide route relative to the present position. The data KK related to the distance to the route represent (indicate) a distance between the guide route and the present position. The data SP related to the start point of route are coordinate data on the map at a point where the navigation operation is started. The data EP related to the end point of route are coordinate data on the map at a point where the navigation operation ends. The data MH related to the direction of the goal represent the direction of the goal with respect to the present position. The data MK related to the distance to the goal represent the distance between the present position and the goal. A guide start flag SF is a flag data for storing the fact that the navigation operation is started. The data AH related to the direction of the start point of route represent the direction of the start point of route with respect to the present position. The data SK related to the distance to the start point of route represent the distance between the present position and the start point of route. The RAM 4 further stores data and variable data (not shown) for executing a variety of processings.

3. Whole Processing.

Figure 3:
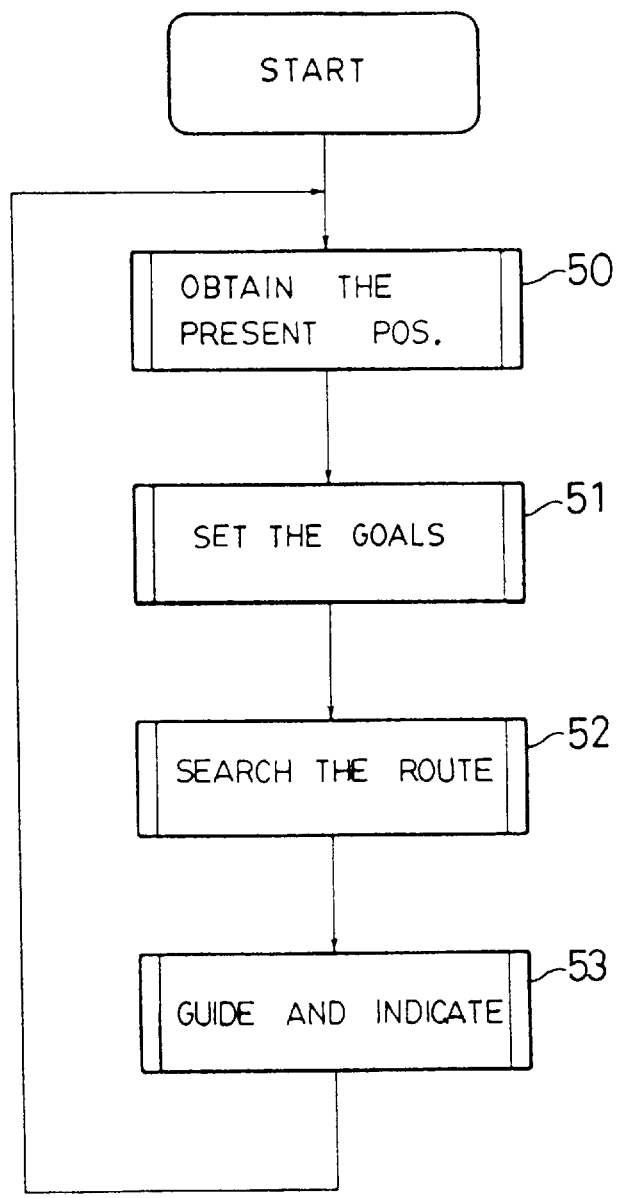
FIG. 3 is a flow chart of the whole processing.

FIG. 3 is a flow chart illustrating the whole processing executed by the CPU 2. This processing starts upon making the power source circuit and terminates upon breaking the power source circuit. Upon starting the program, the CPU 2, RAM 4 and image memory 9, etc. are initialized. Then, a processing for obtaining the present position (step 50), a processing for setting the goal (step 51), a processing for searching the route (step 52) and a processing for the guide and indicating (step 53) are executed repetitively.

In the processing for obtaining the present position (step 50), the present position of the car is calculated based upon the data sent from the present position detecting device 20. In the processing of the step 50 the latitude and longitude are calculated based on the data input from the GPS reception device 25. The data related to the longitude and latitude are stored as the data MP related to the present position in the RAM 4. The data MP related to the present position are corrected by the data related to the present position from the beacon reception device 26 or from the data transmission/ reception device 27.

Operation is further carried out to discriminate the present position (of the car) that has moved based upon the absolute direction data ZD, relative direction data θ and the data ML related to the distance of traveled. The present position (of the car) obtained through this operation is collated with the map data in the external data GD and is corrected; i.e., the present position is correctly indicted on the map picture. Owing to this processing, the present position of the car is correctly found even when GPS signals cannot be received as in running through a tunnel.

In the processing for setting the goal (step 51), the input image of the goal is shown on the display 33 upon manipulation by the user. The user designates any one of the address, phone number or name to thereby designate the goal. Moreover, when a genre is selected from a menu of genres related to sight-seeing resorts, facilities, etc., a list of a plurality of goals stored in the selected genre may be shown on the display 33. Through another manipulation, furthermore, there may be shown detailed contents of the goals. After the goal is selected, the operation is carried out to determine the goal, whereby the data related to the determined goal are stored in the RAM 4 as the goal data TP. Here, the processing for setting the goal (step 51) is jumped over when no operation is carried out to set new goals.

In the process for searching the route (step 52), a guide route to the goal is searched based upon the map data. The road number data of roads constituting the guide route are arranged in order from the start point up to the goal, and the thus arranged road number data are stored in the RAM 4 as the guide route data MW.

Referring to FIG. 4, when the car is going, for example, to a goal TP from a start point SP, the user inputs the start point and the goal in the processing for setting the goal (step 51). Thus, the guide route (indicated by a thick line in the drawing) from the start point SP to the goal TP is automatically searched. The guide route is formed by the combination of roads from an intersection K1 to an intersection K7. This guide route is continuous from the start point SP to the goal TP. The guide route may be the shortest route, the most preferred route, or a recommended route. The guide route includes trunk roads as much as possible from the start point SP to the goal TP, so that the car is allowed to smoothly arrive at the goal. In FIG. 4, the road number data 1, 3, 7, 11 and 14 are stored in this order as the guide route data MW in the RAM 4. The processing for searching the route (step 52) is jumped over when there is no change in the guide route.

In the processing for the guide and indicating (step 53), a guide route found by the processing for searching the route (step 52) is indicated by a thick red line on the map picture shown on the display 33. Then, the guidance for driving the car along the guide route is produced in the form of voice from the speaker 13 or is indicated on the map picture.

Through the repetition of the above-mentioned processings, the guide route to the goals, the present position of the car and the running direction of the car input by the user are indicated on the map picture shown on the display 33. The present position is corrected as the car continues to run. As the car approaches an intersection or a branching point, furthermore, the guidance is offered in the form of voice or indication concerning the intersection or the branching point.

4. Road Data.

Figure 5:
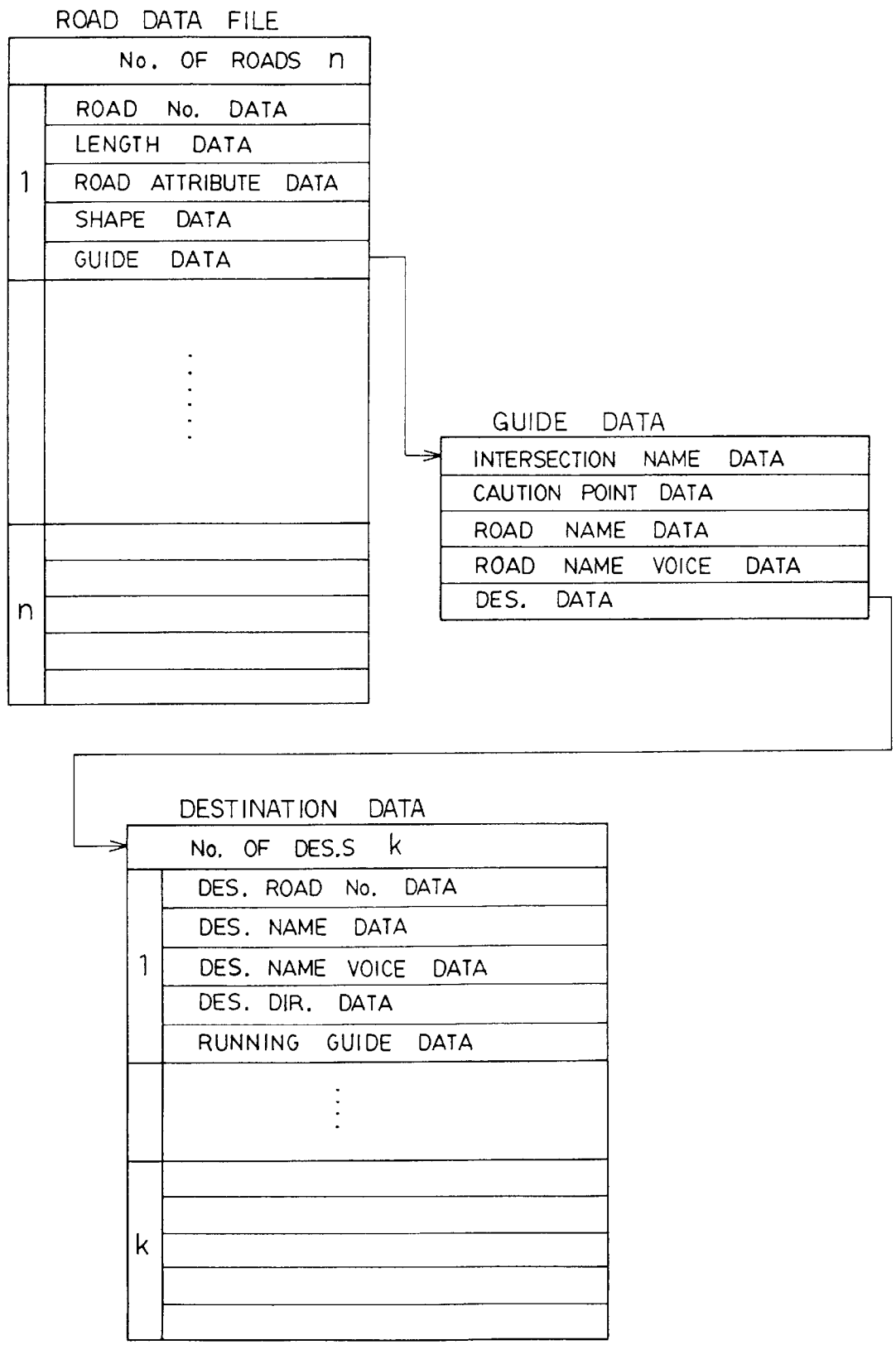
FIG. 5 is a diagram illustrating a road data file stored in a data storage unit 37.

FIG. 5 illustrates part of the road data. The road data are those in a road data file stored in the data storage unit 37. The road data file includes data related to all roads wider than a predetermined width in an area stored in a map data file. When the number of roads included in the road data file is n, the road data related roads of a number n are stored. The road data includes road number data, length data, road attribute data, shape data and guide data. The road number data are identification numbers which are attached to the roads of each portion in the map data. The road attribute data represent attributes such as elevated road, underpass, expressway, toll road, etc. The shape data represent the shape of a road, and comprise coordinate data of nodes of from a start point of the road to an end point. As shown in, for example, FIG. 4, the roads of road numbers 1, 4 and 14 have node numbers N1 to N4. The coordinate data of the nodes are stored as shape data.

The guide data includes intersection name data, caution point data, road name data, road name voice data and destination data. The intersection name data indicates the name of an intersection at the end point of the road. The caution point data represent caution points on the road such as railroad crossing, entrance to a tunnel, exit of a tunnel, a point at which the width of the road decreases, etc. The road name voice data are voice data of road names used for voice guidance.

The destination data are road data of a destination that loads to the end point of the road, and includes data k related to the number of destinations and the data related to each of the destinations. The data related to each of the destinations include destination road number data, destination name data, destination name voice data, destination direction data, and running guide data. The destination road number data represent a road number of the destination. The destination name data represent the road name of the destination. The destination name voice data are for guiding by voice the road name of the destination. The destination direction data represent the direction in which the road of the destination is headed. The running guide data are for guiding the car to move to the right lane or to the left lane to enter into the road of the destination, or to run on the center lane.

5. Processing for determining a start point of route.

Figure 6:
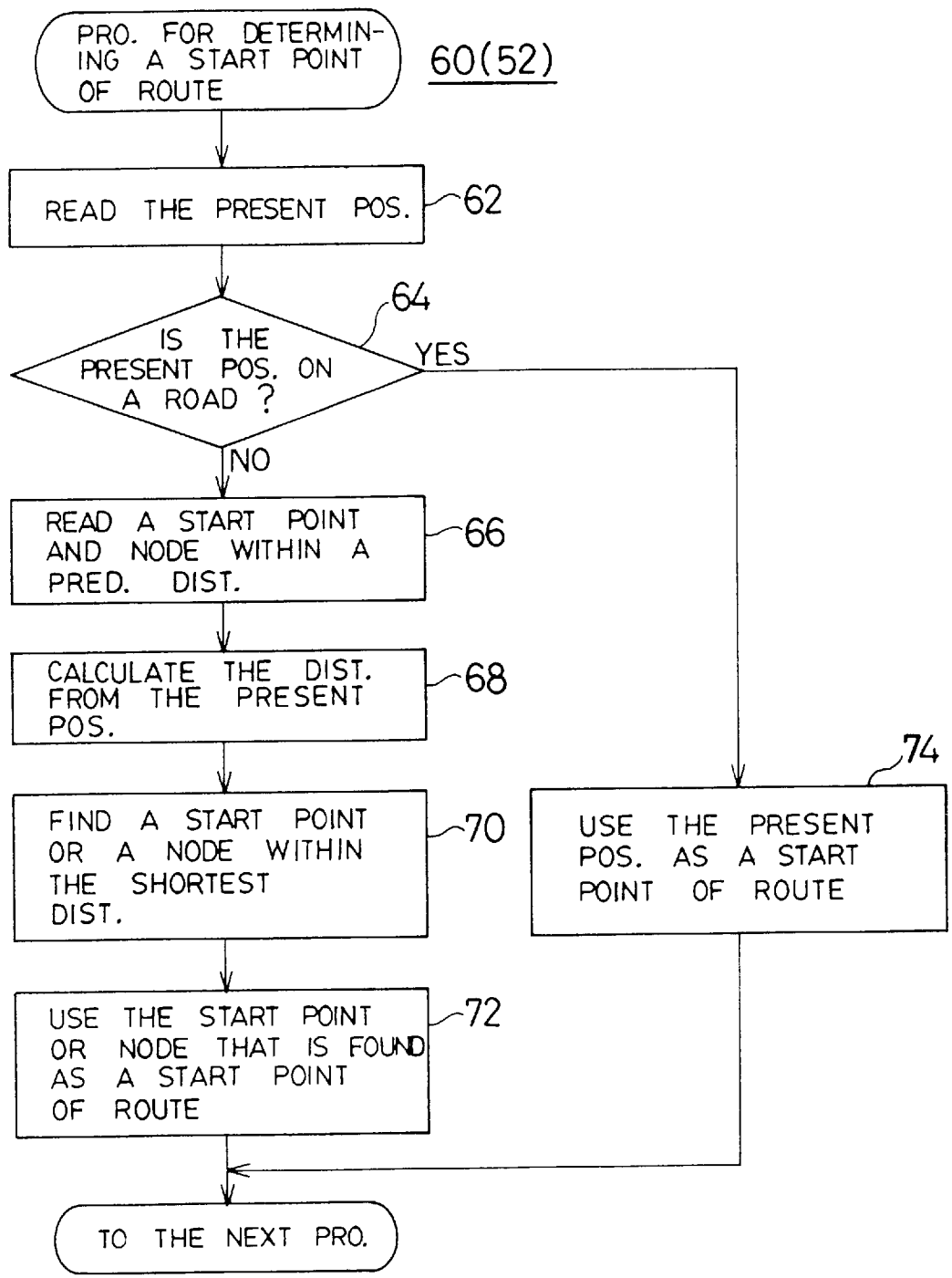
FIG. 6 is a flow chart of a processing for determining a start point of route executed according to a first embodiment.

FIG. 6 is a flow chart of a processing for determining a start point of route (step 60) executed in the processing for searching the route (step 52). The above-mentioned road data contain neither the data of roads narrower than a predetermined width nor the data of private roads. When the present position is not in agreement with the road data, therefore, a start point of route is determined. The start point of route is a start point of guide route, exists on a road stored in the road data, and is a point closest to the present position.

First, the CPU 2 reads the data MP related to the present position (step 62). It is then discriminated whether the present position is on a road stored in the road data file or not (step 64). For example, when the coordinate of the present position data MP or the present position that is estimated, is in agreement with any coordinate in the road data, it means that the present position is on the road. When the present position is on the road stored in the road data file, the data MP related to the present position are stored in the RAM 4 as the data SP related to the start point of route (step 74).

When the present position does not exist on a road stored in the road data file, a road that exists within a predetermined distance from the present position is searched. Then, the data related to the start point of the searched road and the node data are read out (step 66). Distances are then calculated between the present position and the start point data, and between the present position and the node data (step 68). Then, the distances found at the step 68 are compared to pick up the start point or the node that is within the shortest distance from the present position (step 70). When a plurality of points are picked up, a point closest to the goal TP is selected out of them. The coordinate data of the point picked up at the step 70 are stored in the RAM 4 as the data SP related to the start point of route (step 72).

The start point of route may be determined in a manner as described below. That is, a straight line is calculated between the point picked up at the step 70 and a start point or a node in the neighborhood of the above point. Then, a perpendicular is drawn to the straight line from the present position. A point at which the perpendicular intersects the straight line is regarded to be a start point of route. Thus, the start point of route comes closer to the present position. When there are a plurality of intersecting points, a point closest to the present position among these intersecting points is regarded to be a start point of route.

6. Processing for determining an end point of route.

Figure 7:
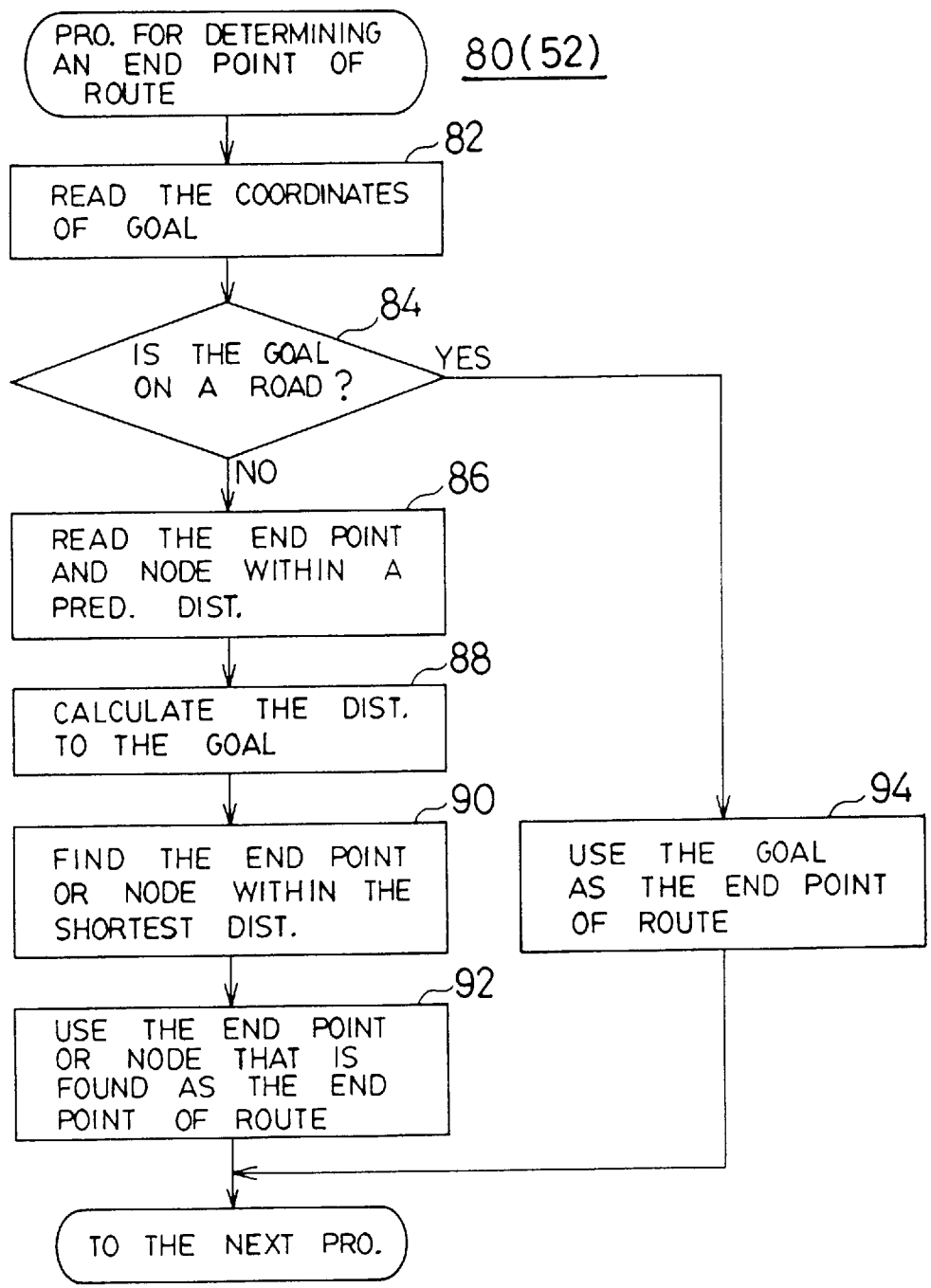
FIG. 7 is a flow chart of a processing for determining an end point of route executed according to the first embodiment.

FIG. 7 is a flow chart illustrating a processing for determining an end point of route (step 80) executed in the processing for searching the route (step 52). As described above, the road data include neither the data of roads narrower than a predetermined width nor the data of private roads. When the goal is not in agreement with the road data, therefore, an end point of route is determined. The end point of route is an end point of guide route, exists on the road stored in the road data, and is a point closest to the goal. The operation for guiding the route is executed from the start point of route up to the end point of route. Therefore, the operation for guiding the route is not executed from the end point of route up to the goal.

First, the CPU 2 reads the goal data TP (step 82). It is then discriminated whether the goal is on a road stored in the road data file or not (step 84). For example, when the coordinate of goal data TP is in agreement with any one of the coordinates in the road data, it means that the goal exists on a road. When the goal is on a road stored in the road data, the goal data TP are stored in the RAM 4 as the data EP related to the end point of route (step 94).

When the goal does not exist on a road stored in the road data file, then, the end point data and node data of a road which are within a predetermined distance from the goal are read out (step 86). Distances are then calculated between the goal and the started point data, and between the goal and the node data (step 88). The distances obtained at the step 88 are compared with each other. There is thus obtained an end point or a node which is within the shortest distance from the goal (step 90). The coordinate data of this point is stored in the RAM 4 as data EP related to the end point of route (step 92).

The end point of route may be determined in a manner as described below. That is, a straight line is calculated between the point picked up at the step 90 and a start point or a node in the neighborhood of the above point. Then, a perpendicular is drawn to the straight line from the goal. A point at which the perpendicular intersects the straight line is regarded to be an end point of route. Thus, the end point of route comes closer to the goal. When there are a plurality of intersecting points, a point closest to the goal among these intersecting points is regarded to be an end point of route.

7. First embodiment.

In a first embodiment, a distance to a goal and a goal direction mark MC which represents the direction of goal are indicated when the end point of route has entered into the map picture. Then, the operator is enabled to change the direction well before the end point of route or is enabled to easily proceed to a road that leads to the goal just before the end point of route. Even when the car as running deviates out of the guide route, the distance is indicated from the goal direction mark MC to the goal. Thus, the driver is enabled to learn that his car is running deviated from the guide route and can easily return back to the proper route.

The distance to the goal and the goal direction mark are further indicated even when the car is running on the guide route in a direction opposite to the direction of the goal. The driver is thus enabled to learn that his car is running in the wrong direction and can proceed in the proper direction. According to the first embodiment, the following processing is executed in the aforementioned whole processing.

8. Processing for indicating the direction mark (first embodiment).

FIG. 8 is a flow chart of a processing for indicating the direction mark (step 100) executed in the processing for the guide and indicating (step 53). This processing is part of the processing for the guide and indicating. It is first discriminated whether the goal is indicated on the display 33 or not (step 102). For instance, the CPU 2 searches from the image processor 9 the image data that are to be sent to the display 33, and discriminates whether the image data includes the coordinate data of goal data TP. Or, the size of coordinate data at four corners of the image data is compared with the size of coordinate data of goal data TP.

When the goal is indicated on the display 33, the driver is allowed to clearly confirm the direction of the goal. Therefore, there is no need to indicate the direction of the goal, and the direction mark is not indicated (step 102 is YES). When there have been indicated the goal direction mark, the mark is erased (step 118).

On the other hand, when the goal is not indicated, it is then discriminated whether the car is running on the guide route or not (step 104). For instance, the CPU 2 searches the road number data of the road on which the car is now running based upon the present position data MP. When the road number data is in agreement with any one of the road number data in the guide route data MW, it means that the car is running on the guide route. When the road number data is in agreement with none of the road number data in the guide road data MW, it means that the car is not running on the guide route. Or, agreement/non-agreement is discriminated between the coordinate data of road data in the guide route data MW and the present position data MP.

When the present position is not on the guide route, the goal direction mark MC and the distance to the goal are indicated on the display 33 in the processings of the steps 110 to 116, and voice guidance is carried out. When the car is deviated from the guide route, therefore, the driver is enabled to confirm the direction of the goal and the distance thereto. Therefore, the driver does not lose his way but is enabled to easily arrive at the goal.

On the other hand, when the car is running on the guide route, it is discriminated whether the car is running backwards (or in a direction opposite to the direction to the goal) or not (step 106). For example, it is discriminated whether the coordinates of the present position data MP are moving from the start point of guide route MW to the end point thereof or not. When the car is running backwards, the goal direction mark MC and the distance to the goal are indicated on the display 33 in the processings of the steps 110 to 116, and voice guidance is carried out. The driver therefore learns that he is running backwards, and confirms the direction of the goal and the distance thereto.

Figure 9:
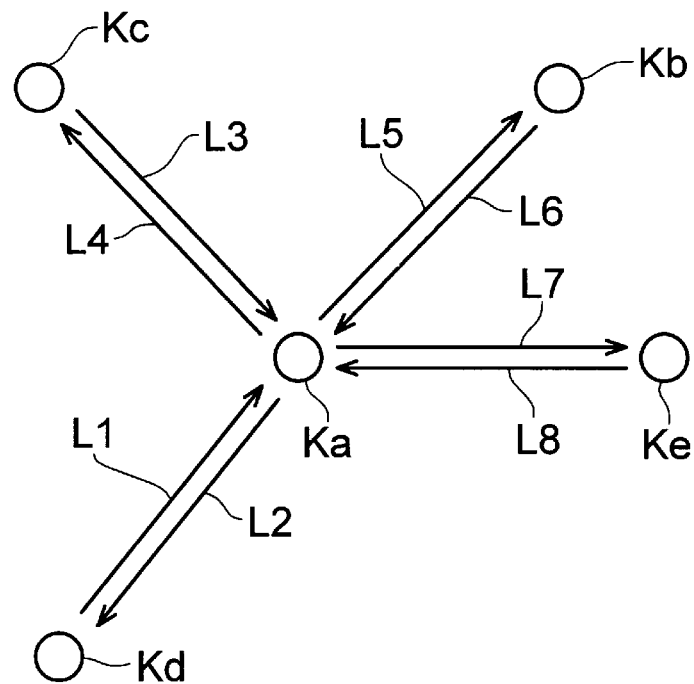
FIG. 9 is a diagram illustrating the constitution of road number data.

Here, as shown in FIG. 9, the road data in the data storage unit 37 may often differ from the above-mentioned data. The roads between the intersection Ka and the intersections Kb to Ke are divided into pairs of lanes L1 to L8 each having an up lane and a down lane. Different road numbers are attached to these lanes. Of these pairs of roads, the lanes of one side only are selected as guide route data MW. When the car is running backwards, or in the wrong direction, therefore, it is discriminated at the step 104 that the car is deviated from the guide route. Therefore, the processing of the step 106 is not necessary.

When the car is not running backwards, on the other hand, the CPU 2 discriminates whether the end point of route is indicated on the map picture or not (step 108a). It is discriminated, for instance, whether the coordinate data of the data EP related to the end point of route are included in the image data or not. Or, the size of the coordinate at four corners of the image data is compared with the size of the coordinate data of the data EP related to the end point of route. When the end point of route is not indicated on the map picture, there is indicated neither the goal direction mark MC nor the distance to the goal (step 108a is NO). The goal direction mark MC and the distance to the goal that happen to have been indicated, are then erased (step 118).

When the end point of route is indicated on the map picture, on the other hand, the direction is calculated from the present position to the goal (step 110). For instance, a straight line is calculated coupling the coordinate data of the present position data MP to the coordinate data of the goal data TP. Then, an angle is calculated between this straight line and the up-and-down direction of the map picture. This angle indicates the direction of the goal. The data related to the direction of the goal are stored in the RAM 4 as the goal direction data MH.

Next, the distance is calculated from the present position to the goal (step 112). For instance, the CPU 2 reads the coordinate data of the present position data MP and the coordinate data of the goal data TP, and calculates a straight line distance between these two coordinates. The data related to the straight line distance are stored in the RAM 4 as the goal distance data MK.

Next, the goal direction mark MC is indicated near the present position mark H3 based upon the goal direction data MH. Based on the goal distance data MK, furthermore, the distance H7 to the goal is indicated by numerals at the left lower corner of the map picture (step 114). For instance, the second RAM 5 is storing an arrow character pattern. The direction of the arrow character pattern is the one represented by the goal direction data MH. Or, the character patterns in the second RAM 5 are a plurality of arrow patterns indicating different directions. Then, a pattern that conforms the angle of the goal direction data MH is selected and is indicated.

The character pattern data of this arrow are sent to the image processor 9 and are synthesized into image data (incorporated therein). Therefore, the goal direction mark MC is indicated near the coordinates of the present position. The coordinates at where the goal direction mark MC is indicated are deviated from the present position data MP for every pattern. Therefore, the goal direction mark MC is indicated on a radial line with the coordinates of the present position as a center.

Figure 10:
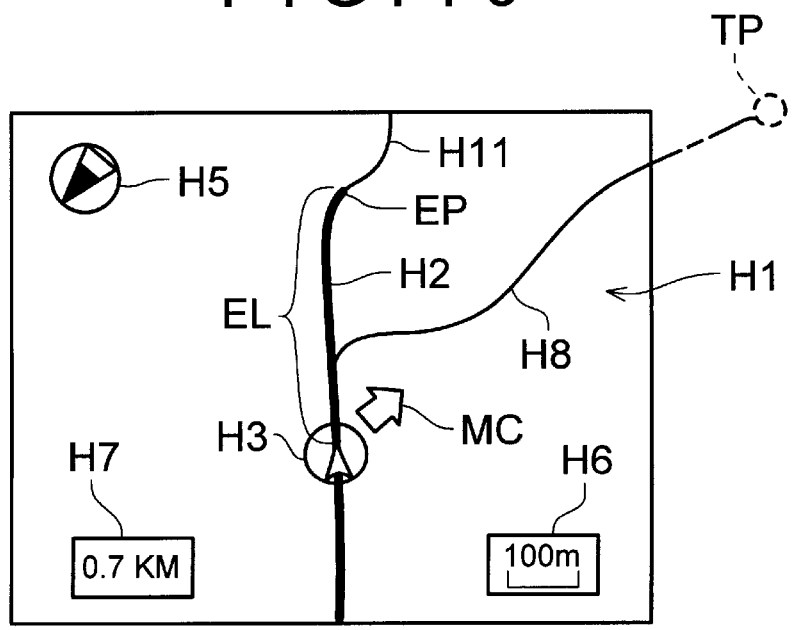
FIG. 10 is a diagram illustrating a picture indicating a goal direction mark MC and a distance H7 up to the goal.

When the car is running on the guide route as shown in, for example, FIG. 10, the present position mark H3 is on the guide route H2. When the goal exists outside the map picture H1 and the end point EP of route has entered into the map picture H1, the goal direction mark MC of the shape of an arrow indicating the direction of the goal TP is indicated near the present position mark H3. The goal direction mark MC has the shape of an arrow indicating the direction of the goal TP. The distance H7 to the goal is indicated at the left lower corner of the map picture H1. Thus, the driver is enabled to easily know the direction in which he should proceed from the present position to the goal TP.

The road H11 shown in FIG. 10 connects to the end point EP of route but does not lead to the goal TP. In the conventional device, the direction of the goal is indicated after the car has arrived at the end point EP of route. Therefore, the driver has no idea about how he should go to the goal and, besides, is unable to suddenly change his direction. According to this embodiment, on the other hand, the goal direction mark MC is indicated when the end point EP of route has entered into the map picture H1. Therefore, when there is a road H8 that leads to the goal just before the end point EP of route, the driver can drive his car along this road H8.

The goal direction mark MC and the distance H7 to the goal are indicated, and the direction of the goal and the distance to the goal are sounded from the speaker 13 (step 116). The voice guidance data have been stored in advance in the ROM 3 or in the ROM 5. The voice guidance data that are adapted to goal direction data MH and to goal distance data MK are selected by the CPU 2, and are sent to the voice processor 11. The voice guidance is sounded like "The goal is in the right (left, upper, lower, upper right, lower right, upper left, lower left) direction, and is - - - meters (kilometers, miles) ahead".

When the present position of the car has approached the goal, the goal is indicated on the map picture provided the map picture has a small scale. When the map picture has a large scale, on the other hand, the goal is not often indicated on the map picture. At the step 108, therefore, the goal direction mark MC and the distance to the goal are indicated or are not indicated depending upon the reduced scale.

9. Second embodiment.

According to the second embodiment, the goal direction mark MC and the distance to the goal are indicated when the end point of route has entered within a predetermined distance from the present position. This enables the driver to change the direction at the end point of route without hurry and to easily take the road that leads to the goal just before the end point of route. When the car is running deviated from the guide route or when the car is running backwards (or in a direction opposite the direction of the goal) on the guide route, the goal direction mark and the distance to the goal are indicated like in the first embodiment.

Figure 11:
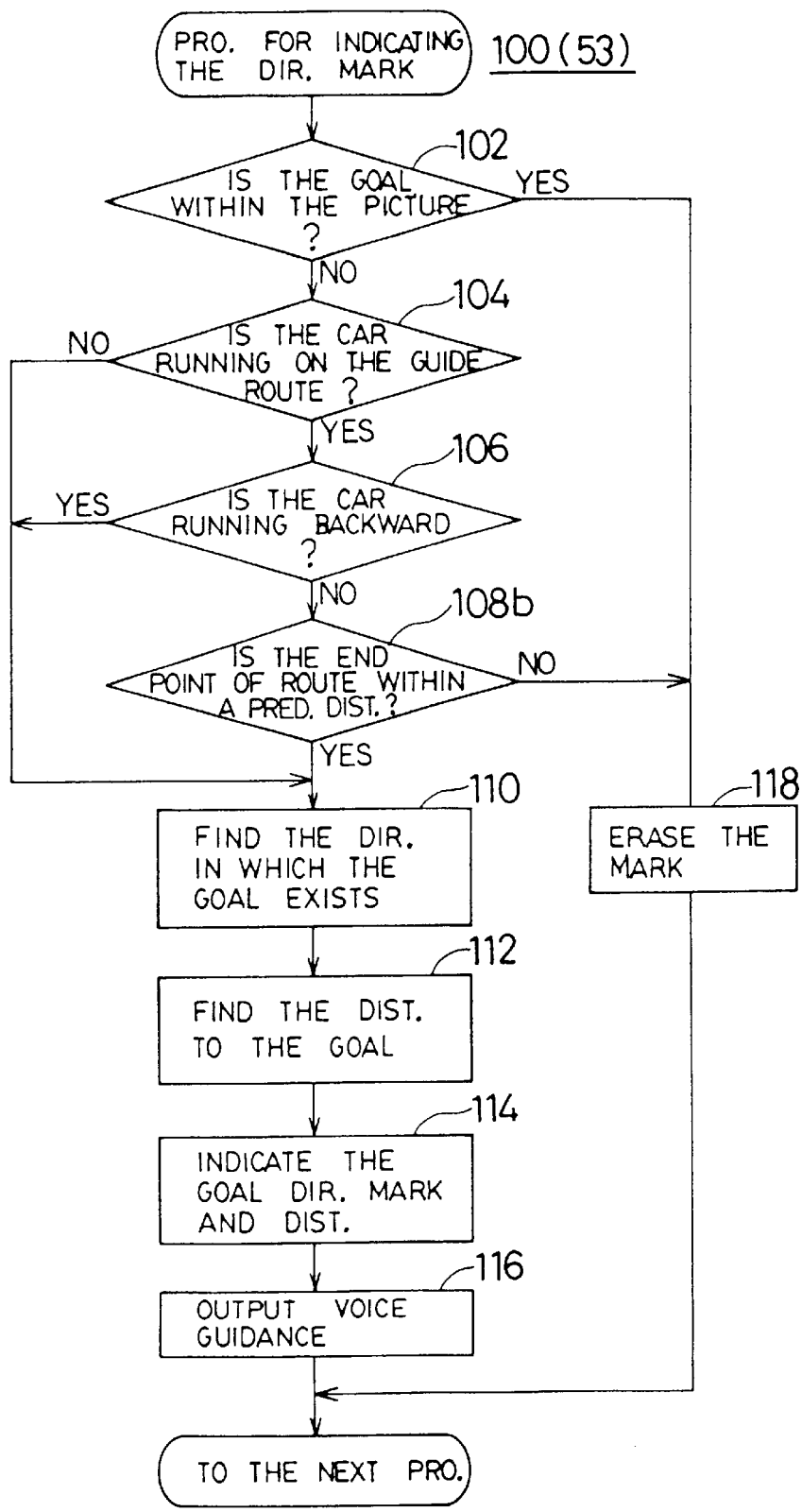
FIG. 11 is a flow chart of a processing for indicating the direction mark executed according to a second embodiment.

In the second embodiment, a processing for indicating the direction mark (step 100) shown in FIG. 11 is executed instead of the processing for indicating the direction mark (FIG. 8) that is executed in the first embodiment. In FIG. 11, the same steps as those of FIG. 8 are denoted by the same reference numerals. In the second embodiment, a step 108*b* shown in FIG. 11 is executed instead of the step 108*a* of FIG. 8.

At the step 108*b*, it is discriminated whether the end point EP of route is within a predetermined distance EL from the present position or not. The CPU 2 reads, for example, the data EP related to the end point of route and the data MP related to the present position. A difference is calculated between the coordinate data of the end point of route and the coordinate data of the present position. Based on the difference of coordinates, a straight line distance is calculated between the end point of route and the present position. The straight line distance is compared with the predetermined distance EL.

When the end point of route is remote from the present position by more than the predetermined distance EL, neither the goal direction mark MC nor the distance to the goal is indicated (step 108*b* is NO). The goal direction mark MC and the distance to the goal are erased when they have been indicated (step 118). When the distance between the end point of route EP and the present position MP is smaller than the predetermined distance EL, the goal direction mark MC and the distance H7 to the goal are indicated (steps 110 to 116).

10. Third embodiment.

In the first and second embodiments, the goal direction mark MC and the distance to the goal are indicated when the car has approached the end point of route. The goal direction mark MC and the distance to the goal are indicated even when the car is running deviated from the guide route or is running backwards (or in a direction opposite to a direction of the goal) on the guide route.

In the third to seventh embodiments, on the other hand, condition of the controlling is not the distance between the present position and the end point of route. In the third to seventh embodiments, the direction in which the car should proceed is informed when the car is running deviated from the guide route or is running on the guide route.

In the third embodiment, the progress direction mark MA is indicated when the car is running deviated from the guide route and when the guide route has been indicated. The progress direction mark MA represents (indicates) the direction of progress on the guide route. When the guide route is not indicated, the route direction mark MB is indicated. The route direction mark MB represents the direction of the guide route. Therefore, the driver is enabled to easily arrive at the goal.

The progress direction mark MA is indicated at a point where the guide route H2 intersects an end line of the map picture H1. Therefore, the driver does not mistake the progress direction mark MA for the guide mark in the direction of progress indicated on the point of intersection. The progress direction mark MA is indicated even when the car is running backwards. The driver therefore learns that his car is running backwards. In the third embodiment, a processing for indicating the direction mark (step 100) shown in FIG. 12 is executed instead of the processing for indicating the direction mark (FIG. 8) executed in the first embodiment.

11. Processing for indicating the direction mark (third embodiment).

FIG. 12 is a flow chart of a processing for indicating the direction mark (step 100) executed in the processing for the guidance and indicating (step 53). This processing is part of the processing for the guidance and indicating (step 53). It is first discriminated whether the goal is indicated on the display 33 or not (step 202). The CPU 2 searches, for example, the image data sent to the display 33 from the image processor 9, and discriminates whether the coordinate data of the goal data TP are included in the image data or not. Or, the size of the coordinate data at four corners of the image data is compared with the size of the coordinate data in the goal data TP.

When the goal is indicated on the display 33, the driver can make sure the direction of the goal. Therefore, there is no need to indicate the direction of progress, and the processing for indicating the direction mark is not executed (step 202 is YES). The progress direction mark MA or the route direction mark MB that happens to have been indicated is erased (step 228).

When the goal is not indicated, on the other hand, it is then discriminated whether the goal is within a predetermined (constant) distance from the present position (step 204). The predetermined distance may be, for example 300 meters. The straight line distance between the two points is calculated based upon, for example, the coordinate data of the present position data MP and the coordinate data of the goal data TP. The straight line distance is compared with the predetermined distance.

When the goal is within the predetermined distance from the present position, the driver can easily arrive at the goal without the need to indicate the goal. Therefore, there is no need to indicate the direction of progress, and the processing for indicating the direction mark is not executed (step 204 is YES). The progress direction mark MA or the route direction mark MB that happens to have been indicated is erased (step 228).

On the other hand, when the goal is not indicated and is remote from the present position by more than the predetermined distance, it is then discriminated whether the car is running on the guide route or not (step 206). The CPU 2 searches, for example, the road number data of the road on which the car is now running based upon the present position data MP. When the road number data is in agreement with any one of the road number data in the guide route data MW, it means that the car is running on the guide route. When the road number data is in agreement with none of the road number data in the guide route data MW, it means that the car is running deviated from the guide route. Or, agreement/ non-agreement is discriminated between the present position data MP and the coordinate data of road data in the guide route data MW.

When the present position is off the guide route, it is then discriminated whether the guide route is indicated on the display 33 or not (step 210). The CPU 2 reads, for example, the guide route data MW. It is then discriminated whether shape data of a number larger than a predetermined number are included in the map picture. The shape data are those that are included in the guide route data MW. The predetermined number is a natural number of 1 or 2 or larger. When the shape data of a number larger than the predetermined number are included in the map picture, the guide route is indicated on the display 33. When the number of the shape data is smaller than the predetermined number, the guide route is not indicated on the display 33.

Or, at a step 210, the CPU 2 reads the road number data included in the image data. The image data are sent from the image processor 9 to the display 33. It is then discriminated whether any one of road number data is in agreement with the road number data in the guide route data MW or not. When the road number data is in agreement, the guide route is indicated on the display 33. When the road number data is not in agreement, the guide route is not indicated on the display 33.

When the guide route is indicated on the display 33, it is then discriminated whether the guide route is within the predetermined distance from the present position (step 212). The CPU 2 reads, for example, the coordinate data of a start point, an end point or a node in the guide route data MW and the coordinate data of the present position. Straight line distances are then calculated between the present position and the start point, end point and node. The shortest straight line distance is picked up out of these straight line distances. The shortest distance that is picked up represents the distance from the present position to the guide route. It is then discriminated whether this distance is smaller than the predetermined distance or not.

When the guide route is remote from the present position by more than the predetermined distance, the processing for indicating the direction mark ends (step 212 is NO). This is because, the progress direction mark MA needs be indicated when the car has approached the guide route. Thus, the progress direction mark MA is indicated during a limited period of time, permitting the CPU 2 to bear a reduced burden of processing.

When the guide route is within the predetermined distance from the present position, on the other hand, a point is calculated at which the guide route intersects an end line of the map picture (step 214). For instance, the CPU 2 picks up the road data in the guide route data MW out of the image data that are sent to the display 33. The road closest to the goal TP is picked up out of the road data. In the guide route data MW are stored the road number data connecting the start point of route to the goal in order. Namely, the road number having the largest order (largest address number) is the one which is closest to the goal. Moreover, shape data of the road closest to the goal are read out on the map picture. The data that lie within the map picture are picked up from the shape data. Furthermore, the shape data ND1 having the largest order (largest address number) is selected out of the shape data that are picked up. A straight line that connects the shape data ND1 to the shape data ND2 having the next largest address number is calculated. Then, the coordinate data are calculated at a point where the straight line intersects an end line of the picture on the display 33. The coordinate data are stored in the RAM 4 as the intersecting point data CP.

Next, the direction of progress on the guide route is calculated (step 216). For instance, the angle of inclination tan θ 1 of a straight line is calculated, the line connecting the coordinates of the shape data ND2 to the coordinates of the intersecting point data CP or to the coordinates of the shape data ND1.

Next, the progress direction mark MA is indicated at a point of intersection (step 217). In the second ROM 5 have been stored the character pattern data of an arrow used as the progress direction mark MA. The arrow character pattern turns depending upon the angle of inclination tan θ 1, and the arrow is directed toward the progress direction data SH. The character pattern data are sent to the image processor 9 and are incorporated in the image data. Then, the progress direction mark MA is indicated at the point CP of intersection. In practice, the coordinates of the progress direction mark are deviated from the intersection point data CP, so that the end of the arrow comes into agreement with the point CP of intersection.

Next, the route direction mark MB that happens to have been indicated is erased (step 218). Then, voice is sounded from the speaker 13 to guide the direction of progress (step 220). The voice is sounded like "The car is proceeding in the right (left, upper, lower, upper right, lower right, upper left , lower left) direction". The data of voice guidance have been stored in advance in the ROM 3 or 5. The voice guidance data that match with the progress direction data SH are selected, and are sent to the voice processor 11.

In the following description, processings of the steps 214, 216, 217, 218 and 220 are expressed as the processing for informing the direction of progress (step 250).

Figure 14:
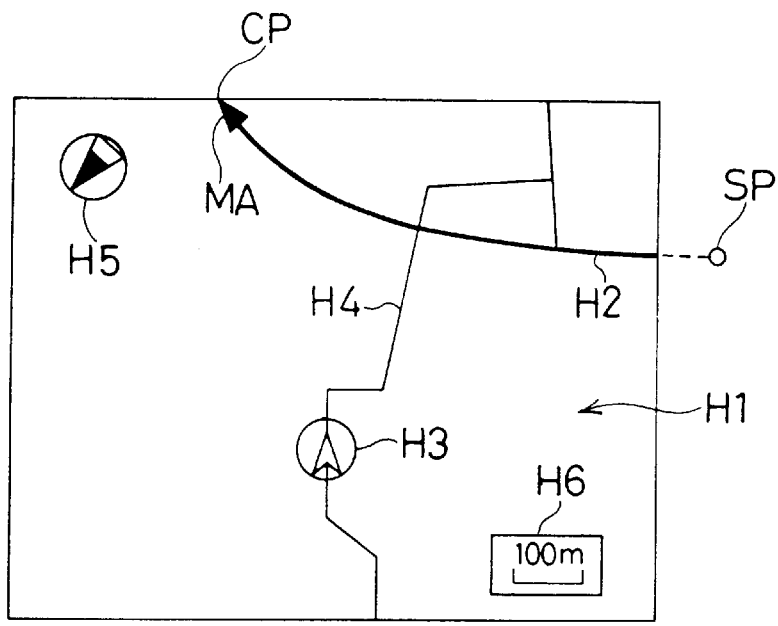
FIG. 14 is a picture indicating a progress direction mark MA.

When the car is running deviated from the guide route H2 as shown in, for example, FIG. 14, the guide route H2 is remote from the present position mark H3. The car is running on a road H4. The goal TP has not been indicated on the map picture H1. In this case, the progress direction mark MA is indicated at a point CP where the guide route H2 intersects an end line of the map picture H1. Therefore, the driver is enabled to easily comprehend the direction in which he should proceed after he has returned back to the guide route.

Here, the car may happen to run in a direction opposite to the direction of the goal. When the step 206 is YES, it is discriminated whether the car is running backwards or not (step 208). For instance, it is discriminated whether the coordinates of the present position data MP are moving from the start point to the end point of the guide route MW or not. When the car is running backwards, the steps 210 to 220 are executed, and the progress direction mark MA is indicated.

Figure 15:
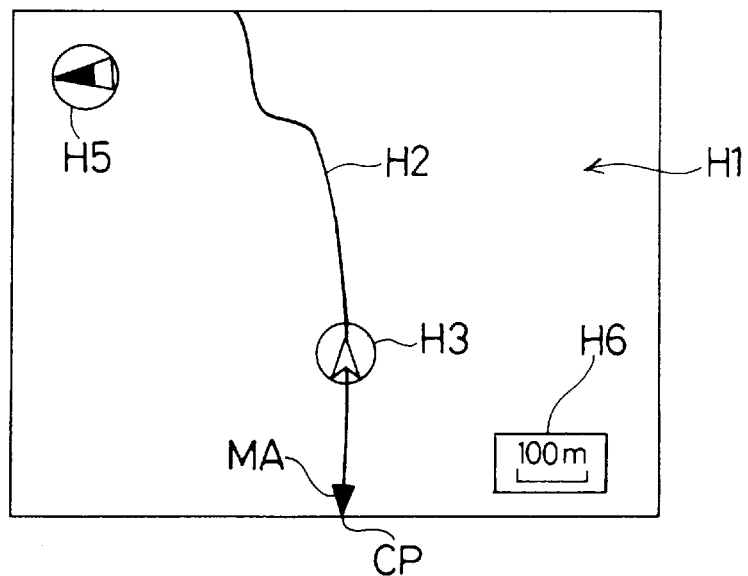
FIG. 15 is a picture indicating a progress direction mark MA of when the car is running in a direction opposite to the direction of the goal.

Referring, for example, to FIG. 15, when the car is running on the guide route, the present position mark H3 is indicated on the guide route H2. Then, the progress direction mark MA is indicated at a point CP where the guide route H2 intersects an end line of the map picture H1. The progress direction mark MA is indicating the direction opposite to the direction of progress of the car. Therefore, the driver readily realizes that he is running backwards.

When the device is storing the road data shown in FIG. 9, the processing of the step 208 is not needed as in the first embodiment.

When the guide route is not indicated on the map picture H1 at the step 210, the direction of the guide route itself and the distance thereto are calculated (step 222). The direction of the guide route and the distance thereto are calculated in a processing for calculating the direction of the route shown in FIG. 13. The direction of the guide route and the distance thereto that are obtained are stored in the RAM 4 as the route direction data KH and as the data KK related to the distance to the route.

Based upon the route direction data KH and the data KK related to the distance to the route, the route direction mark MB and the distance H9 to the route are indicated near the present position mark H3 (steps 224, 225). The distance H9 to the route is a straight line distance to the guide route from the present position. In the second ROM 5 have been stored character pattern data of an arrow used as the route direction mark MB. The arrow character pattern is turned depending upon the route direction data KH, so that the arrow is directed toward the direction of the guide route. The character pattern data are sent to the image processor 9 and are incorporated in the image data. Therefore, the route direction mark MB is indicated near the present position. The coordinates of the route direction mark MB are deviated from the present position data MP, so that the arrow is indicated on a radial line with the present position as a center. The distance H9 to the route indicates numerical figures that vary depending upon the data KK related to the distance to the route.

Next, the voice is sounded from the speaker 13 to guide the direction of the route and the distance thereto (step 226). The voice is sounded like "The guide route is in the right (left, upper, lower, upper right, lower right, upper left, lower left) direction. The distance is XX meters". The voice guidance data have been stored in advance in the ROM 3 or 5. The voice guidance data that match with the route direction data KH and with the data KK related to the distance to the route, are selected and are sent to the voice processor 11.

In the following description, processings at the steps 222, 224, 225 and 226 are expressed as the processing for informing the direction of the route (step 260).

Figure 16:
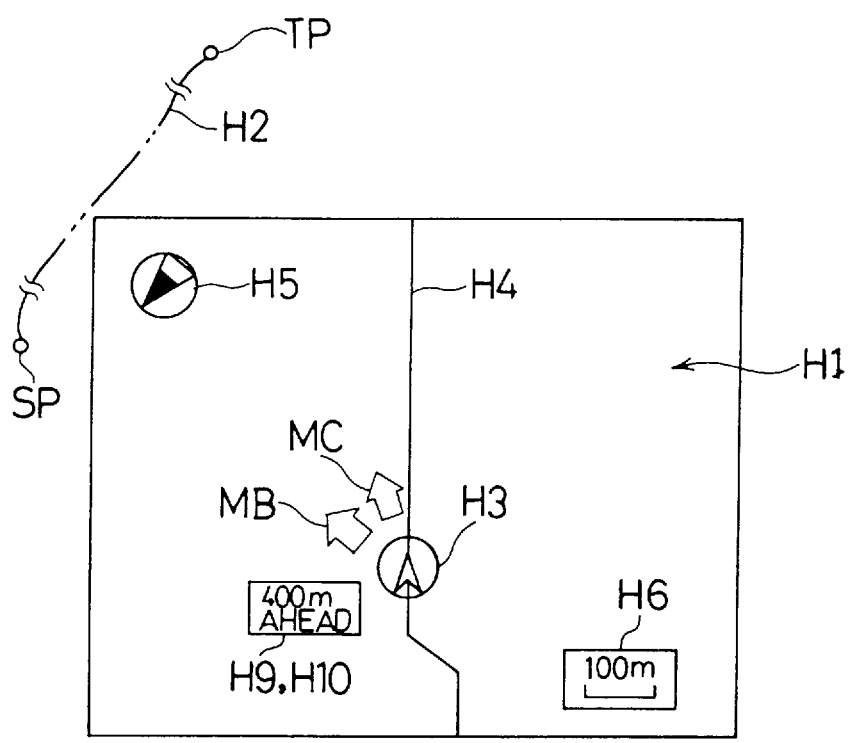
FIG. 16 is a picture indicating a route direction mark MB and a goal direction mark MC.

Referring, for example, to FIG. 16, when the car is running deviated from the guide route H2, the guide route H2 is remote from the present position mark H3. The car is running on a road H4. The guide route H2 is not indicated on the map picture H1. In this case, the route direction mark MB is indicated near the present position mark H3. The route direction mark MB is indicated between the present position mark H3 and the guide route H2. The distance H9 to the route is further indicated near the present position mark H3. The driver is thus enabled to easily return back to the guide route.

12. Processing for calculating (operating) the route direction (third embodiment).

Figure 13:
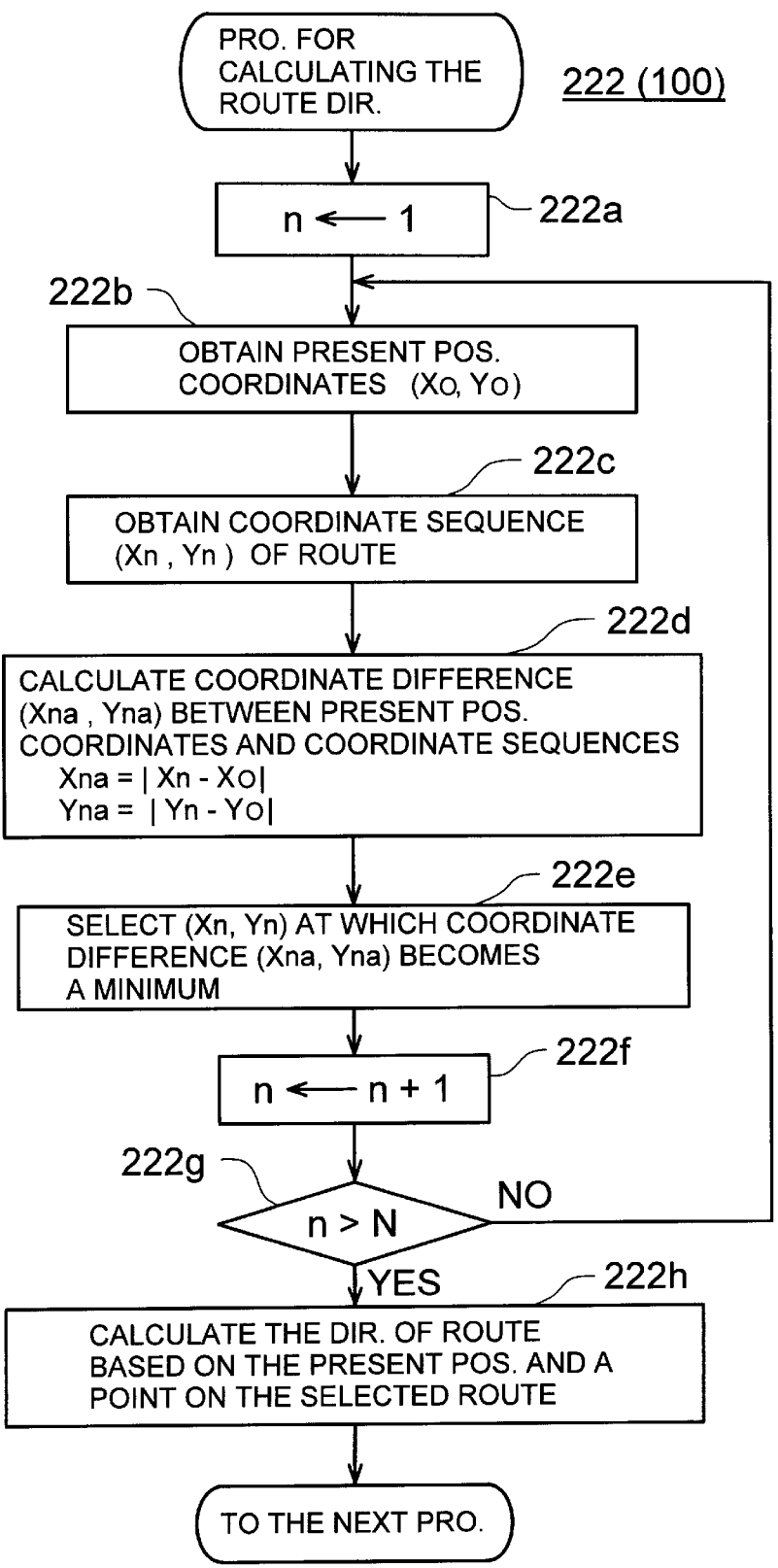
FIG. 13 is a flow chart of a processing for calculating (operating) the route direction executed according to the third embodiment.

FIG. 13 is a flow chart of a processing for calculating the route direction (step 222). The CPU 2, first, resets the counter n to 1 (step 222a). Next, the CPU 2 reads the present position data MP (step 222b). The present position data MP represent the coordinates (X0, Y0) of the present position. Next, the CPU 2 reads the shape data in the guide route data MW (step 222c). In this step 222c, a sequence of coordinates (Xn, Yn) of shape data are successively read out starting from n=1. The coordinates of shape data in a sequence are arranged in order from the start point of route.

Straight line distances are calculated between the present position data MP and the shape data that are read out (step 222d). The straight line distances are differences (Xna, Yna) between the present position coordinates and the coordinate sequence. Here, Xna=|Xn−Xo| and Yna=|Yn−Yo|. The magnitude of differences of these coordinates are compared to thereby pick up the shape data closest to the present position (step 222e). In this step 222e, the magnitude of difference of coordinates calculated in the routine of the previous time is compared with the magnitude of difference of coordinates calculated in the routine of this time, and the smaller one is selected.

The steps 222b to 222e are repeated until "n" reaches "ON" (steps 222f, 222g). Thus, the straight line distances from the present position are calculated for all shape data on the guide route, in order to find the shortest distance. "N" denotes the number of shape data on the guide route. There is no need to calculate the differences for all coordinates of the number "n". For instance, a reference position of a predetermined area may be the present position, and the shape data in the predetermined area may be picked up.

When "n" has reached "N", there is left one data related to a coordinate difference. This data is the coordinate difference data of shape data closest to the present position. A straight line is calculated between the shape data closest to the present position and the present position data MP, and the angle of inclination tan θ 2 of this straight line is calculated. The angle of inclination tan θ 2 is stored in the RAM 4 as the route direction data KH. Furthermore, the shortest distance between the guide route and the present position is stored in the RAM 4 as the data KK related to the distance to the route.

13. Fourth embodiment.

According to a fourth embodiment, the goal direction mark MC is indicated instead of the route direction mark MB of the third embodiment. The goal direction mark MC represents the direction of the goal. In the fourth embodiment, therefore, when the car is running deviated from the guide route and the guide route has been indicated, the progress direction mark MA is indicated. When the guide route is not indicated, the goal direction mark MC is indicated. Therefore, the driver is enabled to easily arrive at the goal.

The progress direction mark MA is indicated at a point where the guide route H2 intersects an end line of the map picture H1. This prevents the driver from mistaking the progress direction mark MA for the guide mark indicating the direction of progress at a point of intersection. The progress direction mark MA is indicated even when the car is running backwards. The driver is thus enabled to learn that the car is running backwards.

Figure 17:
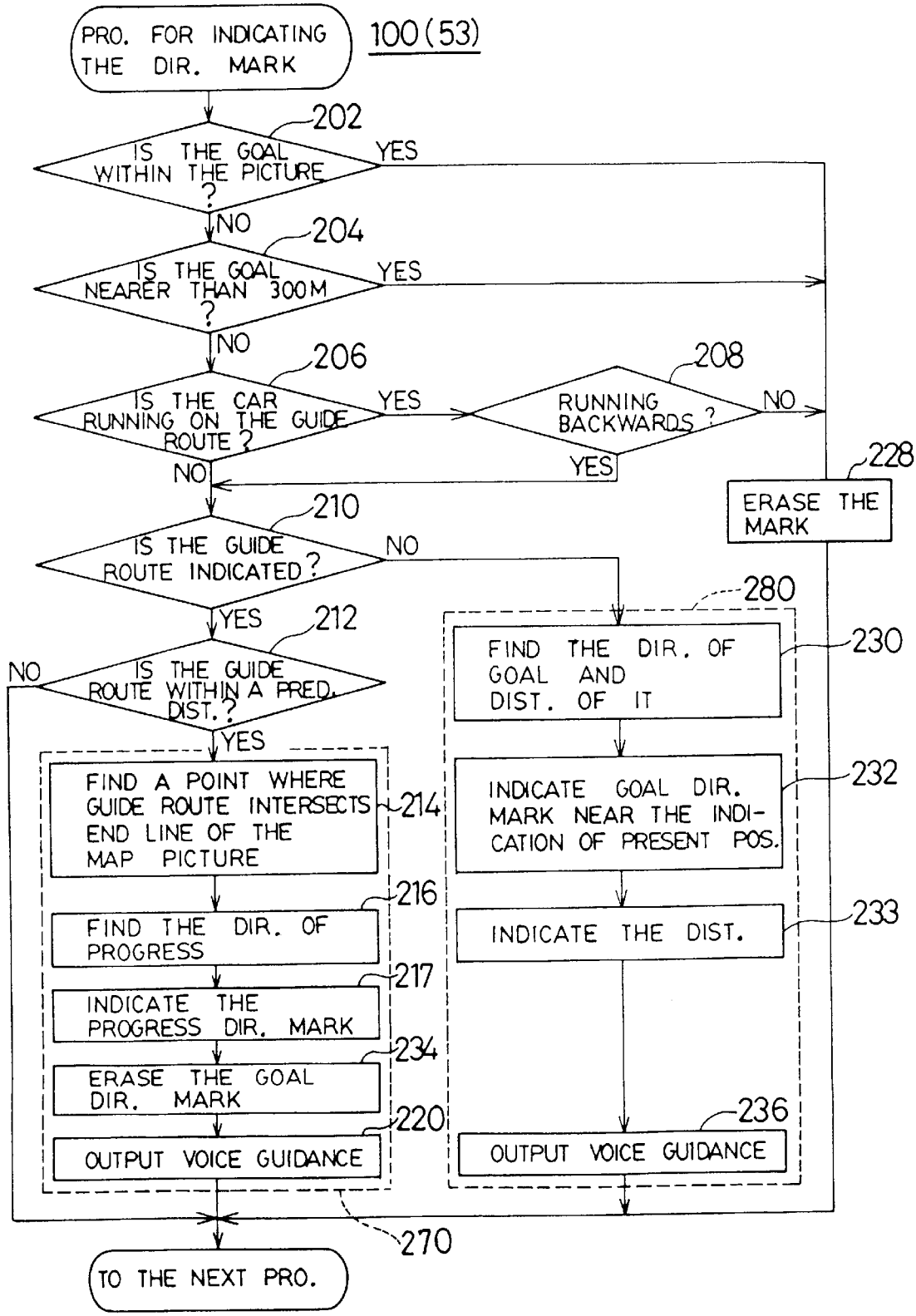
FIG. 17 is a flow chart of a processing for indicating the direction mark executed according to a fourth embodiment.

In the fourth embodiment, a processing for indicating the direction mark (step 100) shown in FIG. 17 is executed instead of the processing for indicating the direction mark (FIG. 12) of the third embodiment. In FIG. 17, the same steps as those shown in FIG. 12 are denoted by the same reference numerals. Moreover, the RAM 4 is provided with a register for storing the goal direction data MH instead of the route direction data KH, and with a register for storing the data MK related to the distance to the goal instead of the data KK related to the distance to the route.

In the fourth embodiment, processings of the steps 230, 232, 233 and 236 are executed as shown in FIG. 17 instead of executing processings of the steps 222, 224, 225 and 226 of FIG. 12. At the step 230, the direction of the goal and the distance thereto are calculated. At the step 232, the goal direction mark MC is indicated. At the step 233, the distance between the present position and the goal is indicated. At the step 236, the direction of the goal and the distance thereto are informed by voice.

The step 230 calculates the angle of inclination tan θ 3 of a line that connects the coordinates of the goal to the coordinates of the present position. The angle of inclination tan θ 3 is stored in the RAM 4 as the goal direction data MH. The step 230 further calculates a straight line distance between the coordinates of the present position and the coordinates of the goal. The distance to the goal is stored in the RAM 4 as the data MK related to the distance to the goal. The step 232 indicates the goal direction mark MC and the distance to the goal based upon the goal direction data MH and upon the data MK related to the distance to the goal like in the step 224 of FIG. 12.

In the second ROM 5 have been stored an arrow character pattern that is used as the goal direction mark MC. The arrow character pattern is turned depending upon the goal direction data MH so that the arrow is directed toward the direction of the goal. The character pattern data are sent to the image processor 9 and are incorporated in the image data. As shown in FIG. 16, therefore, the goal direction mark MC is indicated near the present position mark H3. Based upon the data MK related to the distance to the goal, furthermore, the distance H10 to the goal is indicated near the goal direction mark MC (step 233).

Next, the voice is sounded from the speaker 13 to guide the direction of the goal and the distance thereto (step 236). The voice sounds like "The goal is in the right (left, upper, lower, upper right, lower right, upper left, lower left) direction. The distance is XX meters". The voice guidance data have been stored in advance in the ROM 3 or 5. The voice data that match with the goal direction data MH and with the data MK related to the distance to the goal, are selected and are sent to the voice processor 11.

Hereinafter, processings of the steps 230, 232, 233 and 236 are expressed as the processing for informing the goal direction (step 280). According to the fourth embodiment, furthermore, a step 234 is executed as shown in FIG. 17 instead of executing the step 218 of FIG. 12. At this step 234, the goal direction mark that happens to have been indicated is erased.

Hereinafter, processings of the steps 214, 216, 217, 234 and 220 are expressed as the processing for informing the direction of progress (step 270).

At the step 228, the progress direction mark MA or the goal direction mark MC that happens to have been indicated is erased.

14. Operation and processing for starting the guidance (first to fourth embodiments).

When a guide route is set, the start point SP of route may often be remote from the present position (start point) as described earlier. When the route guidance is started in this case, the present position MP does not exist on the guide route. Therefore, the step 104 is NO in the first or the second embodiment (FIG. 8 or 11), and the step 206 is NO in the third or the fourth embodiment (FIG. 12 or 17).

In the first or the second embodiment as shown in FIG. 10, the goal direction mark MC is indicated (step 114).

In the third or the fourth embodiment, furthermore, it is discriminated whether the guide route is indicated or not (step 210). When the guide route is indicated, the progress direction mark MA is indicated (step 250 or 270). As shown in, for example, FIG. 14, the guide route H2 may be indicated but the start point SP of route may not be indicated. In this case, the progress direction mark MA is indicated. Therefore, the driver, after having arrived at the guide route, can proceed toward the direction of the goal instead of toward the start point SP of route. When the start point SP of route is indicated, the driver is enabled to proceed to the start point SP of route.

When the guide route is not indicated, on the other hand, the step 210 is NO. The start point SP of route is not indicated as a matter of course. In this case, either the step 260 or the step 280 is executed. Then, as shown in FIG. 16, the route direction mark MB or the goal direction mark MC is indicated. The driver therefore is enabled to easily arrive at the guide route.

When the start point SP of route is not indicated and the position of the shortest distance between the present position and the guide route is the start point SP of route, the route direction mark MB indicates the direction of the start point SP of route. The driver therefore is enabled to proceed to the start point SP of route.

15. Fifth embodiment.

In the third and fourth embodiment, when the start point of route is remote from the present position at the time of starting the route guidance operation, there is indicated the progress direction mark MA, the route direction mark MB or the goal direction mark MC. In the fifth embodiment, on the other hand, a start-point-of-route direction mark MD is indicated. The start-point-of-route direction mark MD represents (indicates) the direction of the start point SP of route. Therefore, the driver is enabled to easily arrive at the start point SP of route. In the fifth embodiment, the start-point-of-route direction mark MD is indicated in the case when the start point SP of route is remote from the present position MP at the time of starting the route guidance operation and when there is indicated no start point of route on the display 33.

16. Processing for indicating the direction mark (fifth embodiment).

Figure 18:
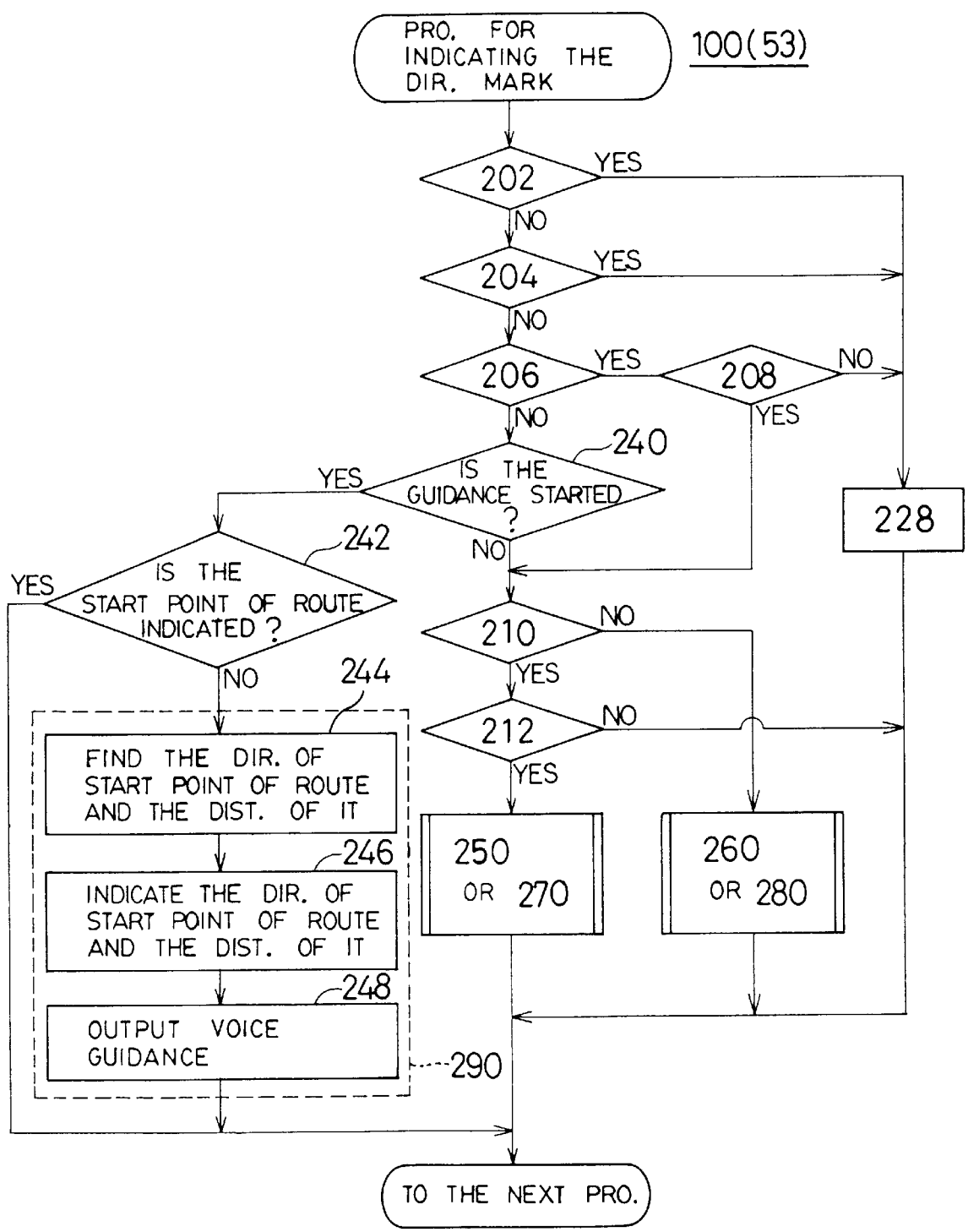
FIG. 18 is a flow chart of a processing for indicating the direction mark executed according to a fifth embodiment.

FIG. 18 is a flow chart of a processing for indicating the direction mark (step 100) executed in the processing for the guidance and indicating (step 53). In the fifth embodiment, a step for indicating the direction of the start point of route is added to the processing for indicating the direction mark shown in FIG. 12 or 17. In FIG. 18, the same steps as those of the processing of FIG. 12 or 17 are denoted by the same reference numerals.

In the fifth embodiment, a step 240 is inserted after the step 206. In this step 240, it is discriminated whether the route guidance operation is started or not. Furthermore, the RAM 4 is provided with a register for storing the guide start flag SF, data AH related to the direction of the start point of route, and data SK related to the distance to the start point of route. The guide start flag SF is turned on when the processing for indicating the guidance (step 53 in FIG. 3) is started under the condition where the start point SP of route is remote from the present position MP. The guide start flag SF is turned off when the car has arrived at the guide route. At the step 240, therefore, it is discriminated whether the guide start flag SF is turned on or not.

The present position does not exist on the guide route when the start point SP of route is remote from the present position MP at the time of starting the route guidance operation. Therefore, the discrimination at the step 206 is NO. The discrimination at the next step 240 is YES. At the step 242, it is discriminated whether the start point SP of route is indicated on the display 33 or not. The CPU 2 searches, for example, the image data that are sent to the display 33 from the image processor 9, and discriminates whether the coordinates of the data SP related to the start point of route are included in the image data. Or, the CPU 2 compares the size of the coordinate data at four corners of the image data with the size of the coordinate data in the data SP related to the start point of route.

When the start point SP of route is not indicated on the display 33, the direction of the start point SP of route from the present position and the distance thereto are found (step 244). The CPU 2 calculates the angle of inclination $\tan \theta\, 4$ of a line which connects the coordinates of the start point of route to the coordinates of the present position. The angle of inclination $\tan \theta\, 4$ is stored in the RAM 4 as the data AH related to the direction of the start point of route. Furthermore, a straight line distance is calculated between the coordinates of the start point of route and the coordinates of the present position, and is stored in the RAM 4 as the data SK related to the distance to the start point of route.

At a next step 246, the start-point-of-route direction mark MD and the distance H12 to the start point of route are indicated based upon the data AH related to the direction of the start point of route and upon the data SK related to the distance to the start point of route like at the step 224 in FIG. 12. The start-point-of-route direction mark MD is an arrow representing the direction of the start point SP of route and is indicated near the present position (step 246).

The direction of the start point of route and the distance thereto are informed by voice (step 248). The voice sounds like "The direction of the start point of route is in the right (left, upper, lower, upper right, lower right, upper left, lower left) direction. The distance is XX meters". The voice guidance data have been stored in advance in the ROM 3 or 5. The voice data that match with the data AH related to the direction of the start point of route and with the data SK related to the distance to the start point of route, are selected and are sent to the voice processor 11.

Hereinafter, processings of the steps 244, 246 and 248 are expressed as the processing for informing the direction of the start point of route (step 290).

Figure 21:
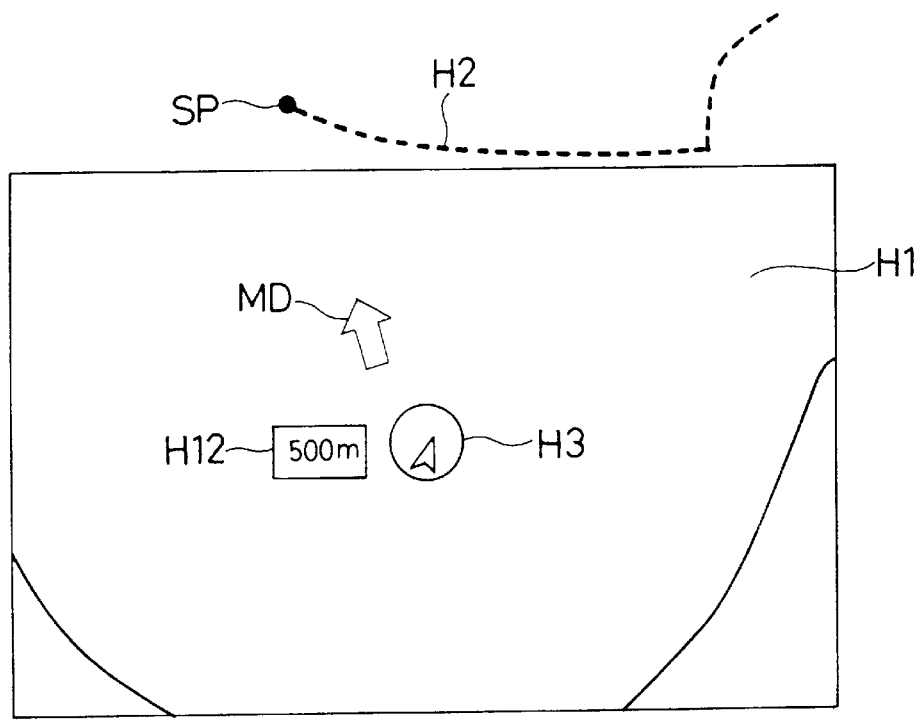
FIG. 21 is a picture indicating a start-point-of-route direction mark MD of when there is indicated none of the guide route or the start point of route.

FIG. 21 shows, for example, a picture at the time of starting the route guidance. The map picture H1 indicates neither the start point SP of route nor the guide route H2. In this case, the start-point-of-route direction mark MD and the distance H12 to the start point of route are indicated near the present position mark H3. This enables the driver to know the direction of the start point SP of route.

Figure 22:
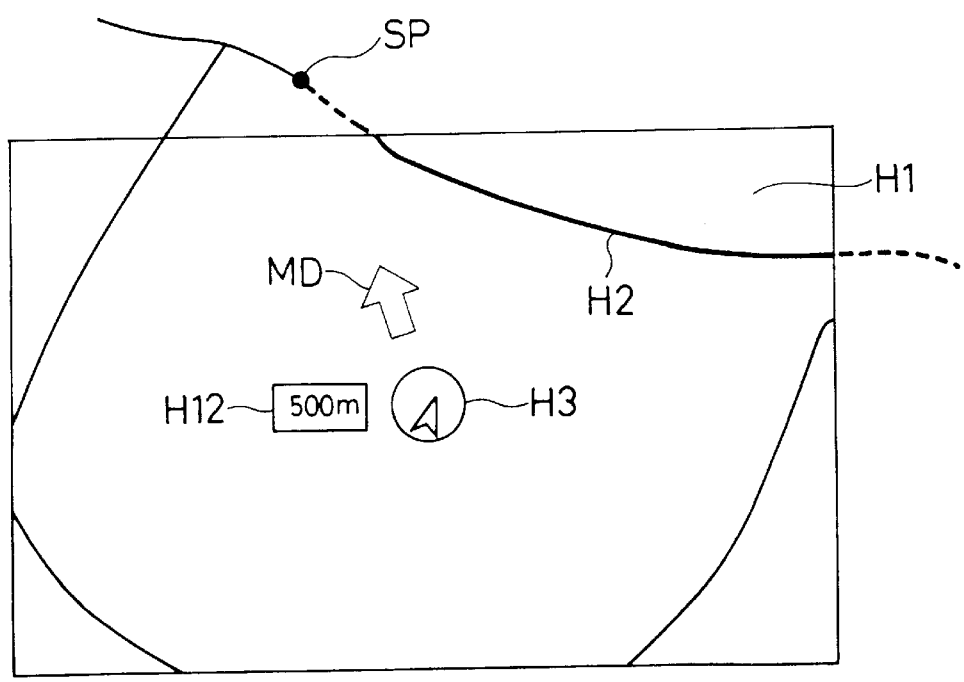
FIG. 22 is a picture indicating the start-point-of-route direction mark MD of when there is indicated the guide route but there is not indicated the start point of route.

FIG. 22 shows another picture at the time of starting the route guidance. This picture indicates the guide route H2 but does not indicate the start point SP of route. Even in this case, there are indicated the start-point-of-route direction mark MD and the distance H12. This enables the driver to proceed to the start point SP of route or to the guide route that is indicated.

According to this embodiment, it is not discriminated at the time of starting the guidance whether the guide route is indicated on the display 33 or not (step 210). The processings (steps 212, 250, 270, 260, 280) after the step 210 are not executed, either. When the guidance is started, therefore, none of the progress direction mark MA, route direction mark MB and goal direction mark MC are indicated.

When the start point of route is indicated on the display 33, on the other hand, the step 242 is YES. In this case, the driver is enabled to proceed to the start point of route that is indicated. Therefore, the processing for informing the direction of the start point of route (step 290) is not executed.

In this embodiment, furthermore, the same processing as that of the third or the fourth embodiment (FIG. 12 or 17) is executed after the start of the route guidance operation. At a step 228, the progress direction mark MA, route direction mark MB, goal direction mark MC or start-point-of-route direction mark MD that happens to have been indicated is erased.

Figure 23:
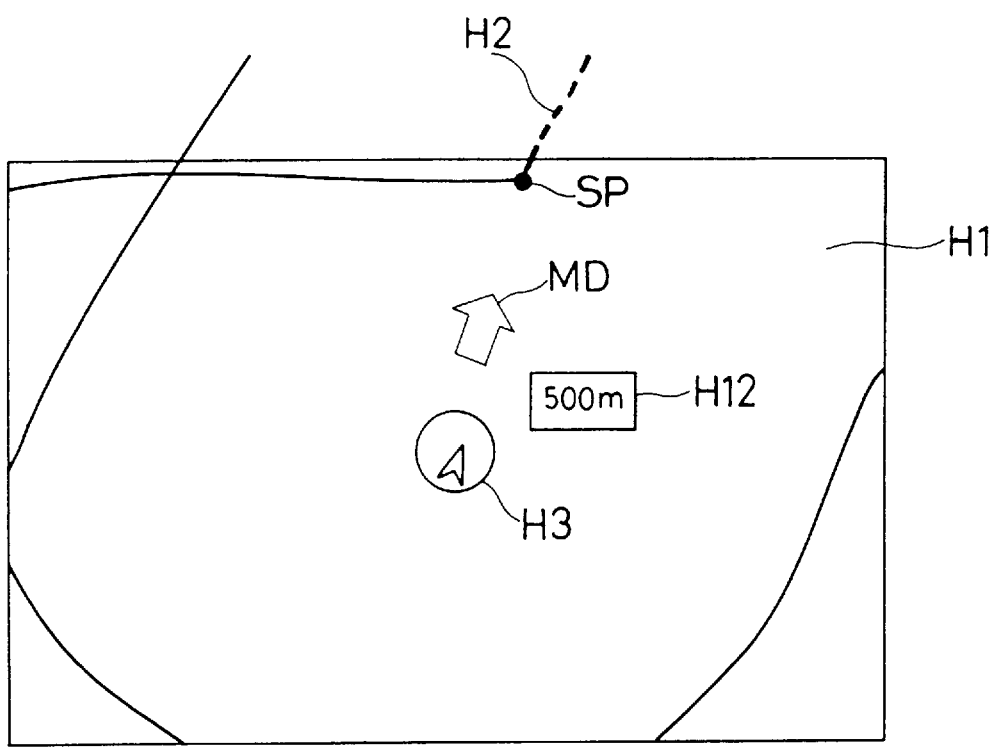
FIG. 23 is a picture indicating the start-point-of-route direction mark MD of when the start point of route is indicated on the end line of the map picture.

The processing of the step 242 may be omitted. In this case, the start-point-of-route direction mark MD and the distance H12 thereto are necessarily indicated on the display 33 when the start point of route is remote from the present position at the time of starting the guidance. Therefore, the start-point-of-route direction mark MD is indicated even when the the start point SP of route is remote from the present position at the time of starting the guidance and is indicated on the display 33. FIG. 23 shows, for example, a picture at the time of starting the guidance. Here, the start point SP of route is indicated at an edge of the map picture H1 and the guide route H2 is indicated somehow. In this case, the start-point-of-route direction mark MD is indicated enabling the driver to quickly confirm the position of the start point of route.

17. Sixth embodiment.

According to a sixth embodiment, the start-point-of-route direction mark MD is indicated when the start point SP of route is remote from the present position MP at the time of starting the route guidance operation and when the guide route has not been indicated on the display 33.

18. Processing for indicating the direction mark (sixth embodiment).

Figure 19:
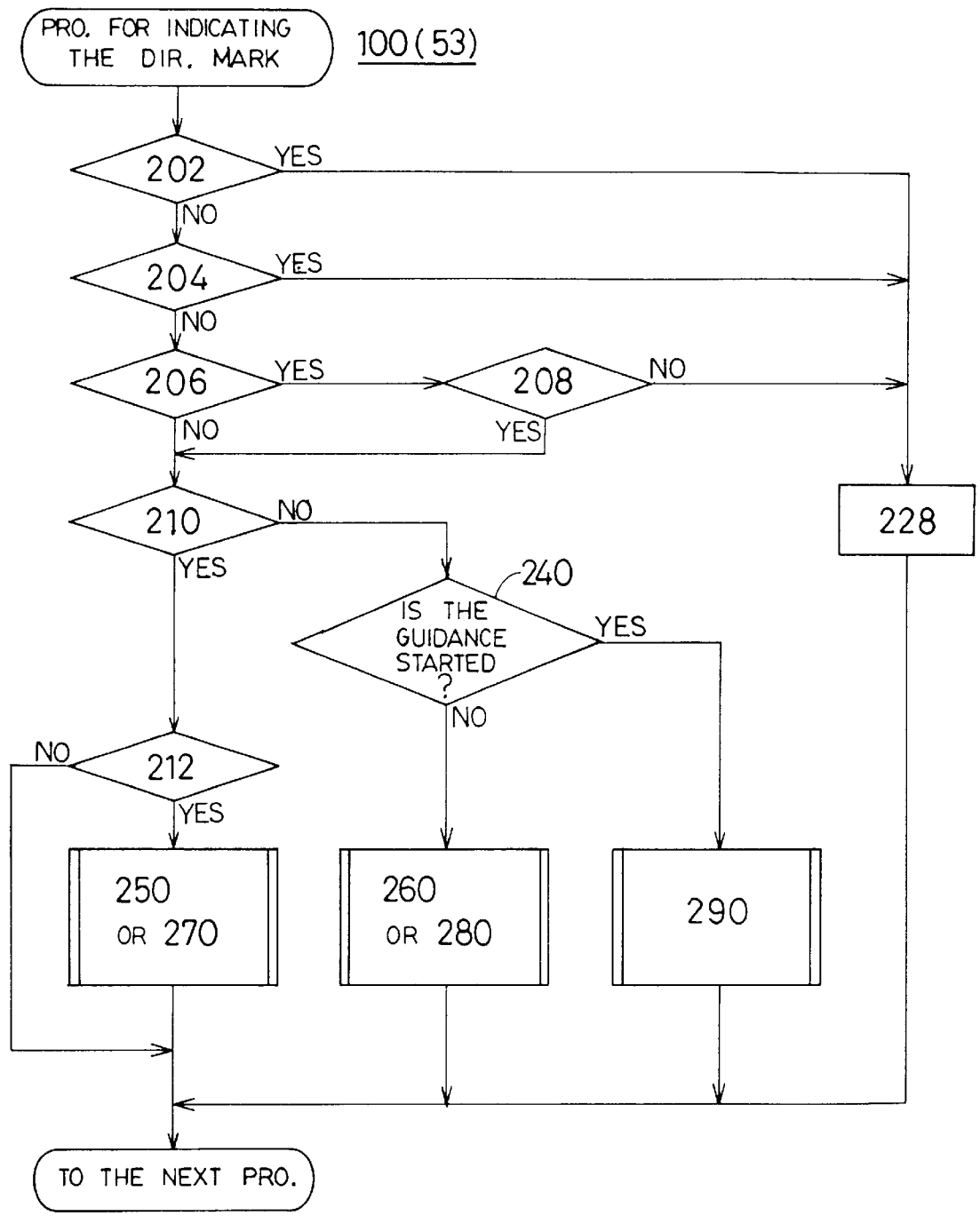
FIG. 19 is a flow chart of a processing for indicating the direction mark executed according to a sixth embodiment.

In the sixth embodiment, a processing for indicating the direction mark (step 100) shown in FIG. 19 is executed instead of the processing for indicating the direction mark (FIG. 18) of the fifth embodiment. In FIG. 19, the same steps as those of the processing of FIG. 12 or 17 are denoted by the same reference numerals. Like in the fifth embodiment, the RAM 4 is provided with a register for storing the guidance start flag SF, data AH related to the direction of the start point of route and data SK related to the distance to the start point of route.

The present position does not exist on the guide route when the start point SP of route is remote from the present position MP at the time of starting the route guidance operation. Therefore, the step 206 is NO. It is then discriminated whether the guide route is indicated or not (step 210). When the guide route is not indicated, it is discriminated whether the route guidance operation is started or not (step 240). When the route guidance operation is started, the step 240 is YES. Accordingly, a processing for informing the direction of the start point of route (step 290) is executed. Thus, there are indicated, on the display 33, the start-point-of-route direction mark MD and the distance H12 of from the present position to the start point of route.

When the guide route has not been indicated at the time of starting the route guidance operation as described above, the start point SP of route is not indicated as a matter of course. This is the case shown in, for example, FIG. 21. In this case, the start-point-of-route direction mark MD and the distance H12 to the start point of route are indicated near the present position mark H3. This enables the driver to learn the direction of the start point SP of route.

In this embodiment, a step 240 is inserted after the step 210. Therefore, neither the route direction mark MB nor the goal direction mark MC is indicated when the start point of route is remote from the present position at the time of starting the route guidance and when the guide route has not been indicated.

On the other hand, the step 210 is YES when the start point of route is remote from the present position at the time of starting the route guidance and when the guide route has been indicated. Accordingly, the processing for informing the direction of progress (step 250 or 270) is executed. The progress direction mark MA is thus indicated on the guide route as shown in FIG. 14.

When the start point of route has been indicated with the guide route, the driver is enabled to proceed to the start point SP of route. In this embodiment, therefore, it is not discriminated whether the start point SP of route is indicated on the display 33 or not.

Furthermore, the progress direction mark MA is indicated when the guide route is indicated while the start point of route is not indicated. The start-point-of-route direction mark MD is indicated when neither the start point of route nor the guide route is indicated. Therefore, the driver does not lose his way.

In this embodiment, furthermore, the same processing as that of the third embodiment or the fourth embodiment (FIG. 12 or 17) is executed after the start of the route guidance operation.

19. Seventh embodiment.

According to a seventh embodiment, the start-point-of-route direction mark MD is indicated when the start point SP of route is remote from the present position MP at the time of starting the route guidance, when the guide route is indicated on the display 33 but when the start point SP of route is not indicated.

20. Processing for indicating the direction mark (seventh embodiment).

Figure 20:
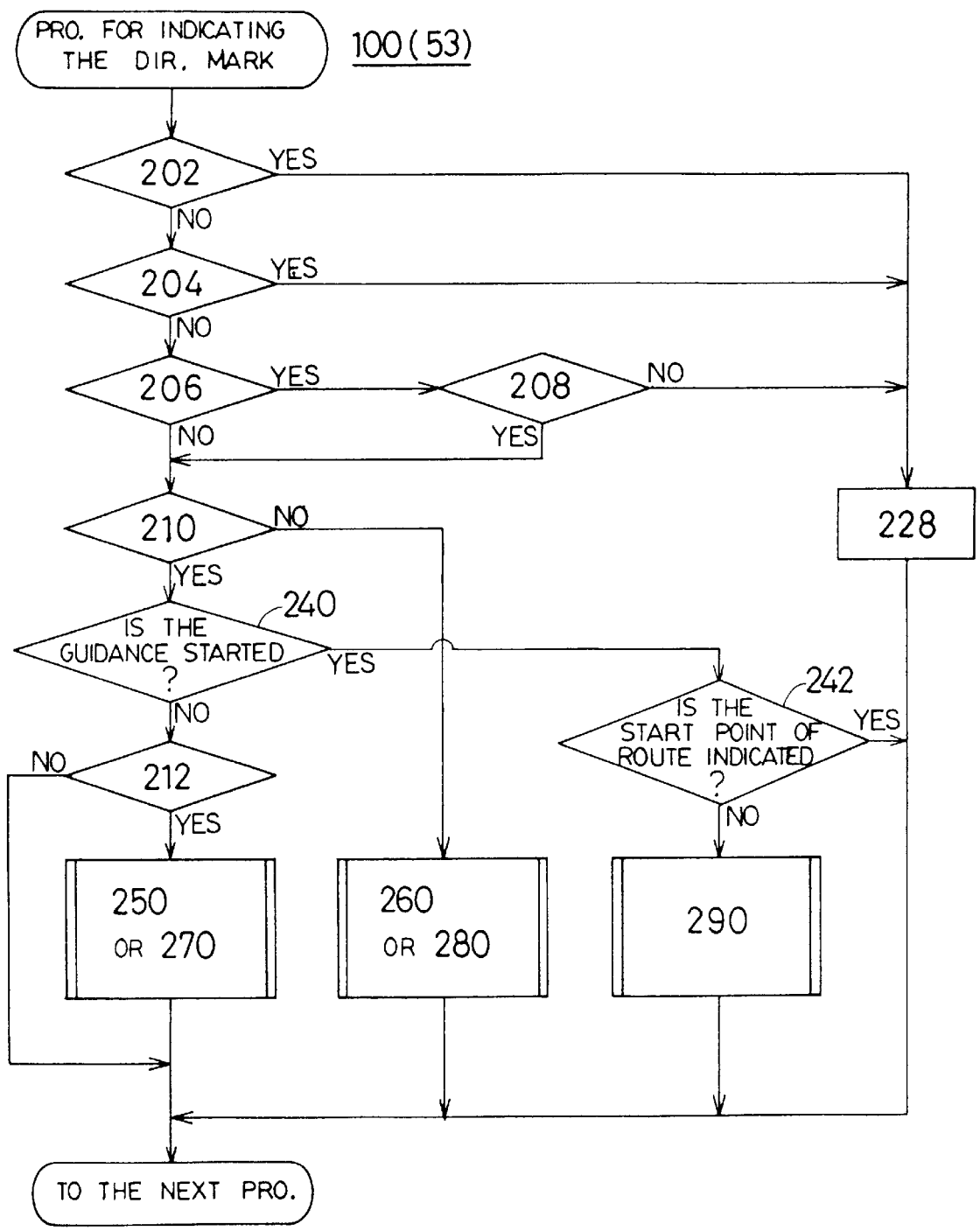
FIG. 20 is a flow chart of a processing for indicating the direction mark executed according to a seventh embodiment.

According to the seventh embodiment, a processing for indicating the direction mark (step 100) shown in FIG. 20 is executed instead of the processing for indicating the direction mark (FIG. 18) of the fifth embodiment. In FIG. 20, the same steps as those of the processing of FIG. 12 or 17 are denoted by the same reference numerals. Like in the fifth embodiment, the RAM 4 is provided with a register for storing the guide start flag SF, data AH related to the direction of the start point of route and the data SK related to the distance to the start point of route.

The present position does not exist on the guide route when the start point SP of route is remote from the present position MP at the time of starting the route guidance. Therefore, the step 206 is NO. Next, it is discriminated whether the guide route is indicated or not (step 210). When the guide route is indicated, it is discriminated whether the route guidance is started or not (step 240). The step 240 is YES when the route guidance is started. It is then discriminated whether the start point SP of route is indicated on the display 33 or not (step 242). A processing for informing the direction of the start point of route (step 290) is executed when the start point SP of route is not indicated. Thus, there are indicated, on the display 33, the start-point-of-route direction mark MD and the distance H12 to the start point of route.

In the case shown in, for example, FIG. 22 according to this embodiment, there are indicated the start-point-of-route direction mark MD and the distance H10. This enables the driver to proceed toward the start point SP of route or toward a part where the guide route is indicated. In the case shown in, for example, FIG. 21, the step 210 is NO. Therefore, the processing for informing the direction of the route (step 260) or the processing for informing the direction of the goal (step 280) is executed. Therefore, there is indicated the route direction mark MB or the goal direction mark MC as shown in FIG. 16. The driver does not know the direction of the start point SP of route but is enabled to arrive at the guide route looking at the mark MB or MC.

The step 242 is YES when the start point of route is remote from the present position at the time of starting the route guidance and when both the start point of route and the guide route are indicated. In this case, nothing is informed. However, there has been indicated the start point SP of route, and the driver is enabled to proceed toward the start point SP of route.

According to this embodiment, furthermore, the same processing as that of the third embodiment or the fourth embodiment (FIG. 12 or 17) is executed after the start of the route guidance operation.

21. Eighth embodiment.

When the user wishes to see the whole or part of the guide route, the map picture must be scrolled. When the map is searched by the user, furthermore, the map picture of a given position is indicated first. In the eighth to eleventh embodiments, the direction of the goal or the like is informed in such cases. The user therefore is allowed to determine the direction for scrolling the picture while looking at the indication of the direction. Therefore, the user is enabled to search the goal or the like within short periods of time. In the eighth embodiment, the goal direction mark MC is indicated when the map picture is scrolled.

22. Processing for indicating the direction mark (eighth embodiment).

Figure 24:
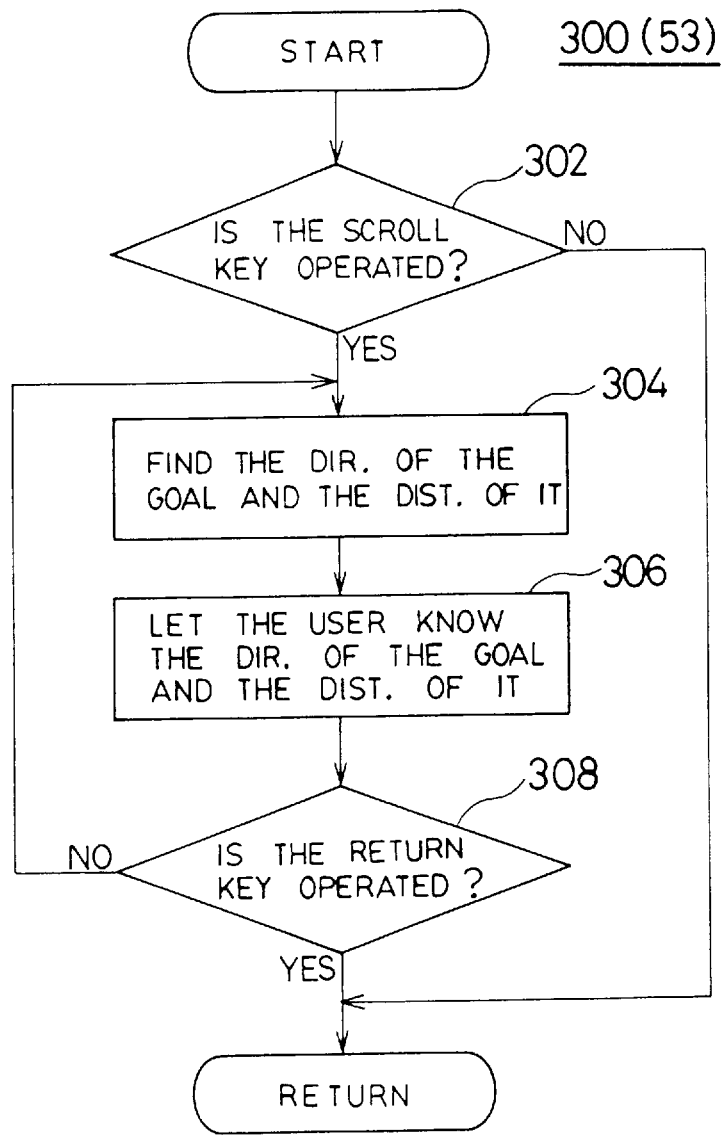
FIG. 24 is a flow chart of a processing for letting the user know the direction of the goal executed according to an eighth embodiment.

FIG. 24 is a flow chart illustrating a processing for indicating the direction mark (step 300) according to the eighth embodiment. This processing is part of the processing for the guidance and indicating (step 53). This processing may be executed instead of the processings for indicting the direction mark (step 100) of the first to seventh embodiments, or may be executed in combination with any one of the processings (step 100).

To scroll the map picture, the user operates touch switch 34 or the scroll key in the switch (not shown) provided in the periphery of the display 33. When the scroll key is operated, the step 302 is YES. When the scroll key is operated, furthermore, a processing is executed for scrolling the picture in a separate subroutine (not shown).

Then, there are calculated the direction from a reference point in the scrolled picture to the goal and the distance from the reference point to the goal (step 304). The reference point have been stored in advance in the first ROM 3 or in the second ROM 5. The reference point may be, for example, a center of the map picture or a center of the upper side of the map picture. The CPU 2 calculates the straight line between the coordinates of the reference point and the coordinates of the goal data TP. The CPU 2 further calculates the angle of inclination of the straight line. The angle of inclination is stored in the RAM 4 as the goal direction data MH. The length of the straight line is further calculated. The length of the straight line is stored in the RAM 4 as the goal distance data MK.

Next, the goal direction mark MC and the distance to the goal are indicated on the map picture based upon the goal direction data MH and upon the data MK related to the distance to the goal (step 304). The goal direction mark MC is indicated at a predetermined position on the map picture. The position of indication may be, for example, a center of the map picture or a position closest to the goal on the end line of the map picture closest to the goal. In this case, the direction of the goal and the distance may be pronounced by voice.

After the scroll key is operated, the steps 304 and 306 are repeated until the return key is operated. Then, the goal direction mark MC and the distance are kept indicated while being updated. When the scroll key is turned off, the scrolling of the picture is stopped. Even in this case, the steps 304 and 306 are repeated. Here, however, the goal direction mark MC and the distance remain unchanged.

When the return key is operated, the image on the display 33 is returned back to the picture of route guidance indicating the present position and the guide route. The return key is a dedicated key or a key which also is used for any other operation. For example, the return key is the one for indicating the present position or is the one for starting the route guidance operation.

When the goal or the guide route is indicated, the goal direction mark MC and the distance may not be indicated.

23. Ninth embodiment.

In the eighth embodiment, the goal direction mark MC and the distance are kept indicated even when the scrolling of the map picture is stopped. According to a ninth embodiment, on the other hand, the goal direction mark MC is indicated only when the scroll key is being operated. When the scrolling of the map picture is stopped, therefore, the goal direction mark MC and the distance are not indicated.

24. Processing for indicating the direction mark (ninth embodiment).

Figure 25:
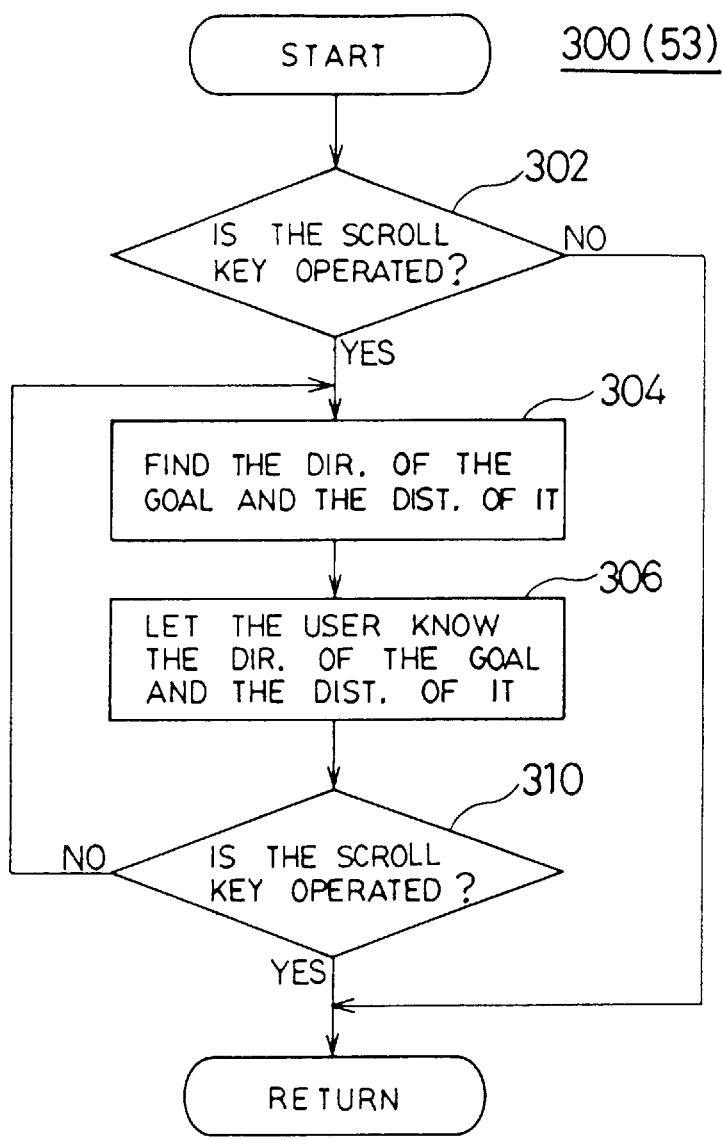
FIG. 25 is a flow chart of a processing for letting the user know the direction of the goal executed according to a ninth embodiment.

In the ninth embodiment, a processing for indicating the direction mark (step 300) shown in FIG. 25 is executed instead of the processing for indicating the direction mark (FIG. 24) of the eighth embodiment. In FIG. 25, the same steps as those of the processing shown in FIG. 24 are denoted by the same reference numerals.

In the ninth embodiment as shown in FIG. 25, a step 310 is executed instead of the step 308 of FIG. 24. At the step 310, it is discriminated whether the scroll key is turned off or not. Therefore, the steps 304 and 306 are repeated as far as the scroll key is being operated. Accordingly, the goal direction mark MC and the distance are kept indicated while being updated. When the scroll key is turned off, the map picture is no longer scrolled, and neither the goal direction mark MC nor the distance is indicated.

Whether the return key is operated or not is discriminated by a separate subroutine. When the return key is operated, the image on the display 33 is returned back to the picture of route guidance.

When the goal or the guide route is indicated, the goal direction mark MC and the distance may not be indicated.

25. Tenth embodiment.

According to a tenth embodiment, the route direction mark MB is indicated when the map picture is scrolled. In the tenth embodiment, steps 312 and 314 shown in FIG. 26 are executed instead of the steps 304 and 306 of FIG. 24 or 25.

At the step 312, there are calculated the direction from a reference point of the scrolled picture to the guide route and the distance from the reference point to the guide route. The reference point is the same as the reference point of the eighth embodiment. At the step 312, the CPU 2 calculates the distance between the coordinates of the reference point and the coordinates of shape data in the guide route data MW.

The shape data closest to the reference point are picked up. Then, a straight line is calculated that connects the coordinates of the shape data that are picked up to the reference point. The angle of inclination of the straight line is calculated. The angle of inclination is stored in the RAM 4 as the route direction data KH. The length of the straight line is stored in the RAM 4 as the data KK related to the distance to the route.

Then, the route direction mark MB and the distance to the guide route are indicated on the map picture based on the route direction data KH and the data KK related to the distance to the route (step 314). The route direction mark MB is indicated at a predetermined position. The position of indication may be, for example, a center of the map picture or an end line of the map picture closest to the goal. In this case, the direction of the guide route and the distance may be pronounced by voice. When the guide route or the goal is indicated, the route direction mark MB and the distance may not be indicated.

26. Eleventh embodiment.

In an eleventh embodiment, the progress direction mark MA is indicated when the map picture is scrolled and the guide route is indicated on the map picture. In the eleventh embodiment, steps 316, 318 and 320 shown in FIG. 27 are executed instead of the steps 304 and 306 of FIG. 24 or 25.

At the step 316, it is discriminated whether the guide route is indicated on the map picture or not. The step 316 executes the same processing as that of the step 210 of FIG. 12. At the step 318, the direction of progress on the guide route is calculated. This step 318 executes the same processings as those of the steps 214 to 216 of FIG. 12. At the step 320, the progress direction mark MA is indicated. The step 320 executes the same processing as that of the step 217 of FIG. 12.

27. Other modified embodiments.

The present invention is in no way limited to the above-mentioned embodiments only but can be modified in a variety of other ways without departing from the spirit and scope of the invention. For instance, the progress direction mark MA, route direction mark MB, goal direction mark MC and start-point-of-route direction mark MD may be indicated in contact with the present position mark H3 or may be indicated at a predetermined position separated away from the present position mark H3. These direction marks MA, MB, MC and MD may be in any character pattern other than arrow, such as a triangle, cartoon like a finger or cartoon like car. The direction marks MA, MB, MC and MD may be replaced by the indication using characters such as upper, lower, left, right, upper left, lower right, lower left, upper right, etc.

When the goal is indicated on the map picture in the first to seventh embodiment, the direction marks MA, MB, MC and MD are inhibited from being indicated (steps 102, 202). Indication of these direction marks may not be inhibited. In this case, the processings of the steps 102 and 202 are omitted. The distance to the goal, the distance to the guide route and the distance to the start point of route may not be indicated.

The voice guidance (steps 116, 220, 226, 236, 248) may not be effected. Or, there may be indicated none of the progress direction mark MA, route direction mark MB, goal direction mark MC and start-point-of-route direction mark MD, and, instead, voice guidance only may be effected.

The step 218 or the step 234 may be executed before the step 216. Or, the step 116, 220, 226, 236 or 248 may be executed before the step 114, 217, 224, 232 or 246. Moreover, the processing of the step 212 or 228 may be omitted.

In the navigation device of the above-mentioned embodiment, the goal is input by the user and the guide route to the goal is automatically set. In the conventional navigation devices, the route to the goal is determined by the manual operation of the user. The present invention can be adapted even to such navigation devices. In this case, the progress direction mark MA, route direction mark MB, goal direction mark MC or start-point-of-route direction mark MD is indicated in connection with the route determined by the user.

The progress direction mark MA may be indicated near a point where the guide route H2 intersects an end line of the map picture H1. Or, the progress direction mark MA may be indicated at any place on the guide route H2. This place may be, for example, a point where the road on which the car is now running intersects the guide route. It is further allowable that the progress direction mark MA moves on the guide route H2 toward the direction of progress. This enables the progress direction mark MA to be recognized more easily.

Moreover, either one or both of the steps 202 and 204 may be omitted. When both of these steps are omitted, the progress direction mark MA, route direction mark MB, goal direction mark MC or start-point-of-route direction mark MD is kept indicated until the car arrives at the goal.

The step 204 of the third embodiment (FIG. 12) may be inserted after the step 102 of the first and second embodiments (FIGS. 8, 11). When the distance between the present position and the goal is smaller than a predetermined distance, therefore, the driver can easily arrive at the goal. Therefore, the goal direction mark MC is not indicated.

Figure 28:
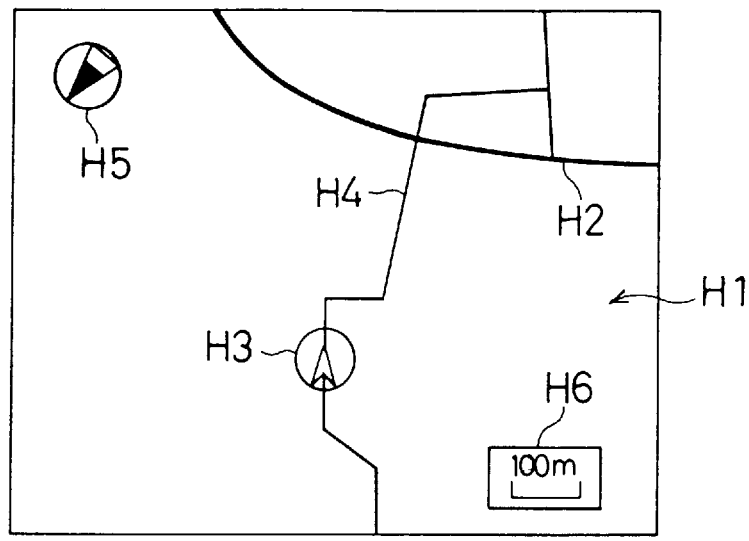
FIG. 28 is a picture shown on a conventional device when the car has deviated out of the route.
Figure 29:
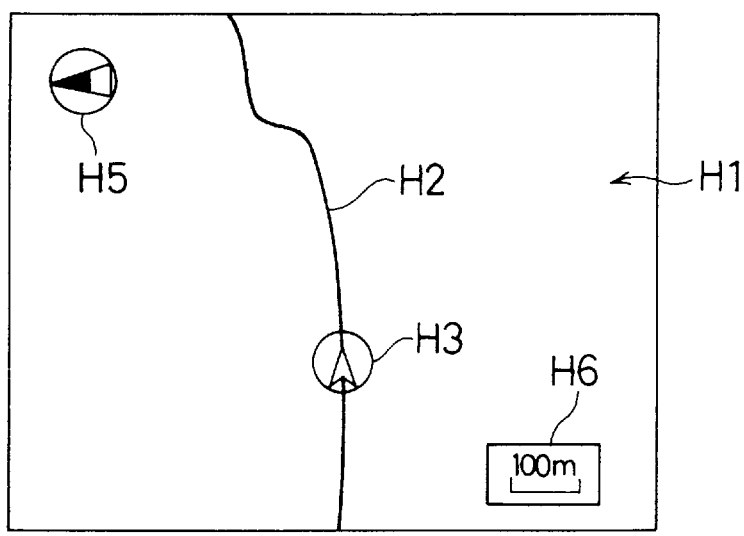
FIG. 29 is a picture shown on the conventional device when the car is running in a direction opposite from the direction of the goal.

It is further allowable that the map picture H1 indicates the present position, guide route and direction indications MA, MB, MC and MD only, but does not indicate other geographical data such as roads, topography, facilities, points, names of the places and sections. For instance, FIG. 15 indicates the guide route H2, present position mark H3 and progress direction mark MA only but may not indicate the direction H5 and the reduced scale H6. Moreover, FIG. 29 may indicate the guide route H2, present position mark H3 and progress direction mark MA only. FIG. 22 may indicate the present position mark H3, guide route H2 and start-point-of-route direction mark MD only. In FIG. 14 or 28, the guide route H2 only may be indicated as the road, but the road H4 on which the car is running may not be not indicated. The direction H5 and the reduced scale H6 may not be indicated, either. In FIG. 16 or 21, the road H4 on which the car is running may not be indicated. But, instead, the present position mark H3 and the route direction mark MB or goal direction mark MC only may be indicated. FIG. 23 may indicate the present position mark H3, guide route H2 and start-point-of-route direction mark MD only. Thus, limited data may be indicated on the map picture H1, so that the driver is enabled to quickly confirm the direction in which he should proceed without the need to give attention to other geographical data.

In these cases, the goal direction mark MC may be indicated together with the progress direction mark MA, route direction mark MB and start-point-of-route direction mark MD. When the position of the car is close to the goal or to the end point of route, limitation imposed on the indicated data may be cancelled. In FIG. 10, therefore, the road H8 is indicated enabling the car to proceed to the goal.

We claim:

1. A navigation device comprising:

present position detection means for detecting the present position of a moving object;

goal-setting means for setting a goal;

route-setting means for setting a route to the goal that is set by said goal-setting means;

route indication means for indicating, on a map picture, the route to the goal set by said route-setting means and the present position;

goal direction calculation means for obtaining a direction from the present position to the goal;

position discrimination means for discriminating whether the present position exists on the route or not; and goal direction informing means for informing the direction of the goal obtained by said goal direction calculation means when it is discriminated by said position discrimination means that the present position does not exist on the route.

2. A navigation device comprising:

present position detection means for detecting the present position of a moving object;

goal-setting means for setting a goal;

route-setting means for setting a route to the goal that is set by said goal-setting means;

route indication means for indicating, on a map picture, the route to the goal set by said route-setting means and the present position;

route indication discrimination means for discriminating whether the route is indicated within the map picture or not;

position discrimination means for discriminating whether the present position exists on the route or not;

goal direction calculation means for obtaining a direction from the present position to the goal; and goal direction informing means for informing the direction of the goal obtained by said goal direction calculation means when it is discriminated by said route indication discrimination means that the route is not indicated within the map picture and when it is discriminated by said position discrimination means that the present position does not exist on the route.

3. The navigation device according to claims 1 or 2, further comprising:

goal indication discrimination means for discriminating whether the goal is indicated within the map picture or not; and information inhibiting means for inhibiting informing of the direction of the goal by said goal direction informing means when said goal indication discrimination means discriminates that the goal is indicated within the map picture.

4. The navigation device according to claims 1 or 2, further comprising:

distance discrimination means for discriminating whether a distance between the goal and the present position is shorter than a predetermined distance or not; and information inhibiting means for inhibiting informing of the direction of the goal by said goal direction informing means when said distance discrimination means discriminates that the distance between the goal and the present position is shorter than the predetermined distance.

5. The navigation device according to claims 1 or 2, wherein said goal direction informing means informs direction of the goal by voice.

6. The navigation device according to claims 1 or 2, further comprising:

distance-to-the-goal calculation means for calculating a distance between the present position and the goal; and distance-to-the-goal informing means for informing the distance calculated by said distance-to-the-goal calculation means when said goal direction informing means informs the direction of the goal.

7. The navigation device according to claim 2, wherein said goal direction informing means indicates the direction of the goal on the map picture, the navigation device further comprising:

information erasing means for erasing indication of the direction of the goal from the map picture when said route indication discrimination means discriminates that the route is indicated on the map picture;

direction-of-progress calculation means for obtaining a direction of progress to the goal on the route; and direction-of-progress informing means for informing the direction of progress obtained by said direction-of-progress calculation means when the indication of the direction of the goal is erased by said information erasing means.

8. A navigation device comprising:

present position detection means for detecting the present position of a moving object;

goal-setting means for setting a goal;

route-setting means for setting a route to the goal that is set by said goal-setting means;

route indication means for indicating, on a map picture, the route to the goal set by said route-setting means and the present position;

direction-of-progress calculation means for obtaining a direction of progress to the goal along the route;

position discrimination means for discriminating whether the present position exists on the route or not; and direction-of-progress informing means for informing the direction of progress obtained by said direction-of-progress calculation means when it is discriminated by said position discrimination means that the present position does not exist on the route.

9. The navigation device according to claim 8, further comprising:

distance-to-the-route discrimination means for discriminating whether the route is remote from the present position by more than a predetermined distance or not; and information inhibiting means for inhibiting informing of the direction of progress by said direction-of-progress informing means when said distance-to-the-route discrimination means discriminates that the route is remote from the present position by more than a predetermined distance.

10. The navigation device according to claim 8, further comprising:

goal indication discrimination means for discriminating whether the goal is indicated within the map picture or not; and information inhibiting means for inhibiting informing of the direction of progress by said direction-of-progress informing means when said goal indication discrimination means discriminates that the goal is indicated within the map picture.

11. The navigation device according to claim 8, further comprising:

distance discrimination means for discriminating whether a distance between the goal and the present position is shorter than a predetermined distance or not; and information inhibiting means for inhibiting informing of the direction of progress by said direction-of-progress informing means when said distance discrimination means discriminates that the distance between the goal and the present position is shorter than the predetermined distance.

12. The navigation device according to claim 8, wherein said direction-of-progress informing means informs the direction of progress by voice.

13. A navigation device comprising:

present position detection means for detecting the present position of a moving object;

goal-setting means for setting a goal;

route-setting means for setting a route to the goal that is set by said goal-setting means;

route indication means for indicating, on a map picture, the route to the goal set by said route-setting means and the present position;

route indication discrimination means for discriminating whether the route is indicated within the map picture or not;

position discrimination means for discriminating whether the present position exists on the route or not;

route direction calculation means for obtaining a direction from the present position to the route; and route direction informing means for informing the direction of the route obtained by said route direction calculation means when it is discriminated by said route indication discrimination means that the route is not indicated within the map picture and when it is discriminated by said position discrimination means that the present position does not exist on the route.

14. The navigation device according to claim 13, further comprising:

distance-to-the-route calculation means for calculating a distance between the present position and the route; and distance-to-the-route informing means for informing the distance calculated by said distance-to-the-route calculation means when said route direction informing means informs the direction of the route.

15. The navigation device according to claim 13, further comprising:

goal indication discrimination means for discriminating whether the goal is indicated within the map picture or not; and information inhibiting means for inhibiting informing of the direction of the route by said route direction informing means when said goal indication discrimination means discriminates that the goal is indicated within said map picture.

16. The navigation device according to claim 13, further comprising:

distance discrimination means for discriminating whether a distance between the goal and the present position is shorter than a predetermined distance or not; and information inhibiting means for inhibiting informing of the direction of the route by said route direction informing means when said distance discrimination means discriminates that the distance between the goal and the present position is shorter than the predetermined distance.

17. The navigation device according to claim 13, wherein said route direction informing means informs the direction of the route by voice.

18. The navigation device according to claim 13, wherein said route direction informing means indicates the direction of the route on the map picture, the navigation device further comprising:

information erasing means for erasing the indication of the direction of the route from the map picture when said route indication discrimination means discriminates that the route is indicated on the map picture;

direction-of-progress calculation means for obtaining a direction of progress to the goal on the route; and direction-of-progress informing means for informing the direction of progress obtained by said direction-of-progress calculation means when the indication of the direction of the route is erased by said information erasing means.

19. A method of displaying navigational information of a moving object comprising the steps of:

a) determining a present position of the object;

b) setting a route to a desired goal;

c) displaying a map picture of the route to the goal;

d) determining a direction of the goal from the present position;

e) discriminating whether the present position is located on the route; and f) displaying information indicative of the direction of the goal upon determination in said step e) that the present position is not located on the route.

20. The method of displaying navigational information of claim 19, comprising the further steps of:

g) discriminating whether the goal is displayed on the map picture; and h) inhibiting display of the information indicative of the direction of the goal upon discrimination in said step g) that the goal is displayed on the map picture.

21. The method of displaying navigational information of claim 19, comprising the further steps of:

g) determining if a distance between the goal and the present position is shorter than a predetermined distance; and h) inhibiting display of the information indicative of the direction of the goal upon determination in said step g) that the distance is shorter than the predetermined distance.

22. The method of displaying navigational information of claim 19, wherein said step f) further comprises providing audio information indicative of the direction of the goal.

23. The method of displaying navigational information of claim 19, comprising the further steps of:

g) determining a distance between the present position and the goal; and h) displaying the distance determined in said step g).

24. A method of displaying navigational information of a moving object comprising the steps of:

a) determining a present position of the object;

b) setting a route to a desired goal;

c) displaying a map picture of the route to the goal;

d) determining a direction of progress of the object to the goal along the route;

e) discriminating whether the present position is located on the route; and f) displaying information indicative of the direction of progress upon discrimination in said step e) that the present position is not located on the route.

25. The method of displaying navigational information of claim 24, comprising the further steps of:

g) discriminating whether the route is remote from the present position by more than a predetermined distance; and h) inhibiting display of the information indicative of the direction of progress upon discrimination in said step g) that the route is remote from the present position by more than the predetermined distance.

26. The method of displaying navigational information of claim 24, comprising the further steps of:

g) discriminating whether the goal is displayed on the map picture; and h) inhibiting display of information indicative of the direction of progress upon discrimination in said step g) that the goal is displayed on the map picture.

27. The method of displaying navigational information of claim 24, comprising the further steps of:

g) discriminating whether a distance between the goal and the present position is shorter than a predetermined distance; and h) inhibiting display of the information indicative of the direction of progress upon discrimination that the distance is shorter than the predetermined distance.

28. The method of displaying navigational information of claim 24, wherein said step f) further comprises providing audio information indicative of the direction of progress.

29. A method of displaying navigational information of a moving object comprising the steps of:

a) determining a present position of the object;

b) setting a route to a desired goal;

c) displaying a map picture of the route to the goal;

d) discriminating whether the route is displayed within the map picture;

e) discriminating whether the present position is located on the route;

f) determining a direction from the present position to the goal; and g) displaying information indicative of the direction of the goal upon discrimination in said step d) that the route is not displayed within the map picture and discrimination in said step e) that the present position is not located on the route.

30. The method of displaying navigational information of claim 29, comprising the further steps of:

h) discriminating whether the goal is displayed on the map picture; and i) inhibiting display of the information indicative of the direction of the goal upon discrimination in said step h) that the goal is displayed on the map picture.

31. The method of displaying navigational information of claim 29, comprising the further steps of:

h) determining if a distance between the goal and the present position is shorter than a predetermined distance; and i) inhibiting display of the information indicative of the direction of the goal upon determination in said step h) that the distance is shorter than the predetermined distance.

32. The method of displaying navigational information of claim 29, wherein said step g) further comprises providing audio information indicative of the direction of the goal.

33. The method of displaying navigational information of claim 29, comprising the further steps of:

h) determining a distance between the present position and the goal; and i) displaying the distance determined in said step h).

34. The method of displaying navigational information of claim 29, comprising the further steps of:

h) erasing the information indicative of the direction of the goal upon discrimination in said step d) that the route is displayed within the map picture;

i) determining a direction of progress to the goal on the route; and j) displaying information indicative of the direction of progress upon erasing of the information indicative of the direction of the goal in said step h).

35. A method of displaying navigational information of a moving object comprising the steps of:

a) determining a present position of the object;

b) setting a route to a desired goal;

c) displaying a map picture of the route to the goal;

d) discriminating whether the route is displayed within the map picture;

e) discriminating whether the present position is located on the route;

f) determining a direction from the present position to the route; and g) displaying information indicative of the direction of the route upon discrimination in said step d) that the route is not displayed within the map picture and discrimination in said step e) that the present position is not located on the route.

36. The method of displaying navigational information of claim 35, comprising the further steps of:

h) determining a distance between the present position and the route; and i) displaying information indicative of the distance.

37. The method of displaying navigational information of claim 35, comprising the further steps of:

h) discriminating whether the goal is displayed within the map picture; and i) inhibiting display of the information indicative of the direction of the route upon discrimination in said step h) that the goal is displayed within the map picture.

38. The method of displaying navigational information of claim 35, comprising the further steps of:

h) discriminating whether a distance between the goal and the present position is shorter than a predetermined distance; and i) inhibiting display of the information indicative of the direction of the route upon discrimination in said step h) that the distance is shorter than the predetermined distance.

39. The method of displaying navigational information of claim 35, wherein said step g) further comprises providing audio information indicative of the direction of the route.

40. The method of displaying navigational information of claim 35, comprising the further steps of:

h) erasing the information indicative of the direction of the route upon discrimination in said step d) that the route is displayed within the map picture;

i) determining a direction of progress to the goal on the route; and j) displaying information indicative of the direction of progress upon erasing of the information indicative of the direction of the route in said step h).

* * * * *

UNITED STATES PATENT AND TRADEMARK OFFICE
CERTIFICATE OF CORRECTION

PATENT NO. : 5,842,147
DATED : Nov. 24, 1998
INVENTOR(S) : Nimura et al.

It is certified that error appears in the above-identified patent and that said Letters Patent is hereby corrected as shown below:

On the title page:

In Item: "[30] Foreign Application Priority Data:", please add the following Japanese application at the end:

-- March 6, 1995 [JP] Japan .........................7-045538 --.

Signed and Sealed this

Twenty-first Day of March, 2000

Attest:

Attesting Officer

Q. TODD DICKINSON

Commissioner of Patents and Trademarks